United States Patent [19]

Hood

[11] Patent Number: 4,560,017
[45] Date of Patent: Dec. 24, 1985

[54] VEHICLE PLATFORM SCALE

[75] Inventor: Robert B. Hood, Snohomish, Wash.

[73] Assignee: Lodec, Inc., Lynnwood, Wash.

[21] Appl. No.: 580,945

[22] Filed: Feb. 16, 1984

[51] Int. Cl.$^4$ .................. G01G 3/14; G01G 21/24
[52] U.S. Cl. .................. 177/211; 177/255; 177/DIG. 9
[58] Field of Search ............ 177/211, DIG. 9, 255

[56] References Cited

U.S. PATENT DOCUMENTS

| 1,411,211 | 3/1922 | Hapgood .................. 177/DIG. 9 |
| 3,661,220 | 5/1972 | Harris . |
| 3,938,603 | 2/1976 | Shoberg et al. ............. 177/DIG. 9 |
| 4,010,811 | 3/1977 | Muccillo, Jr. ............... 177/DIG. 9 |
| 4,095,659 | 6/1978 | Blench et al. . |
| 4,210,216 | 7/1980 | Godden . |
| 4,281,728 | 8/1981 | Dickason et al. . |

FOREIGN PATENT DOCUMENTS 2240441 11/1975 France .................. 177/DIG. 9

OTHER PUBLICATIONS

Eldec Drawing entitled "Low-Height 11' Axle Load Platform Scale Assembly".

Primary Examiner—George H. Miller, Jr.
Attorney, Agent, or Firm—Christensen, O'Connor, Johnson & Kindness

[57] ABSTRACT

A vehicle platform scale includes a weighbridge platform mounted on transversely positioned load cell assemblies. Each load cell assembly is comprised of a deflectable load cell, a tray for supporting the load cell, and suspension means for suspending the load cell from the tray. The platform is mounted to the load cell assemblies such that loads on the platform are transmitted to the load cells producing a corresponding strain therein. Strain gauges mounted to the load cells produce output signals representing the strain of the load cells.

Alternative load cell suspension configurations are disclosed for minimizing inaccuracies produced when a vehicle is miscentered on the platform thereby causing a tilt of a load cell within its tray. In one such configuration, the load cell is suspended from the tray by means of first and second spaced-apart pivots which permit rotational deflection of the intermediate portion of the load cell in response to an applied load. The pivots are aligned within an axial plane of the load cell, which axial plane is substantially neutral to both tensive and compressive transmitted loads. In various disclosed embodiments, the pivots are formed of pins projecting from each load cell that mate with seats or tracks in the tray, a ball affixed to, or hinged from the tray that mates with a socket on the load cell, or a pair of shackles that are pivotally mounted to both the load cell and the tray.

30 Claims, 16 Drawing Figures

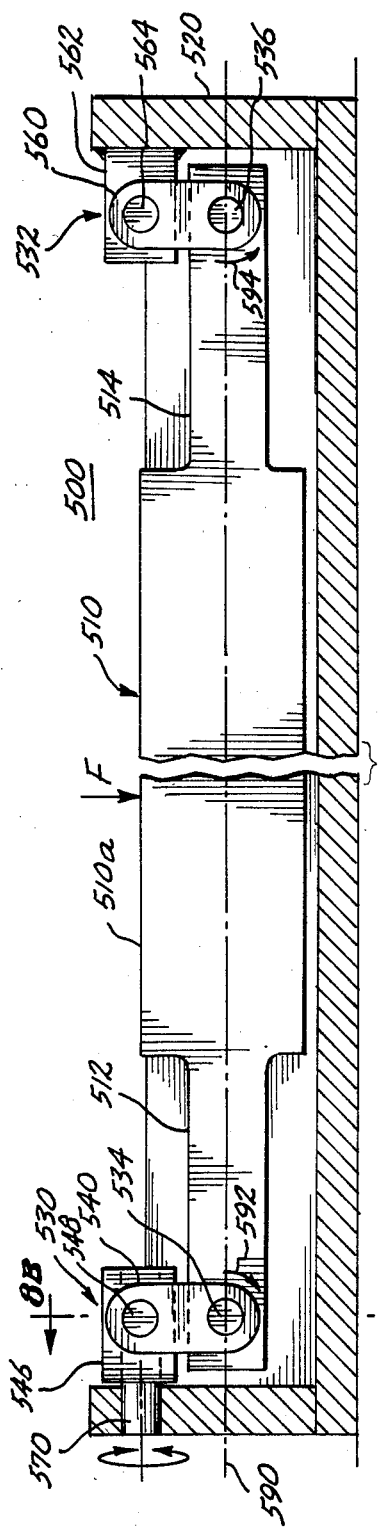
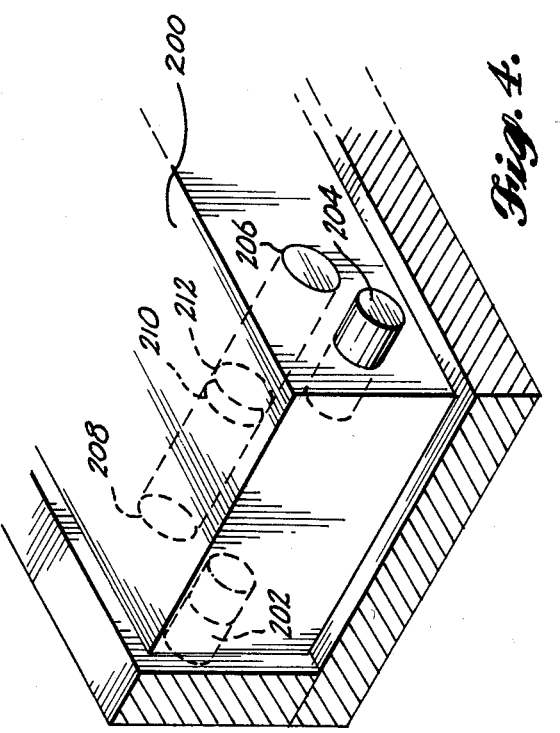
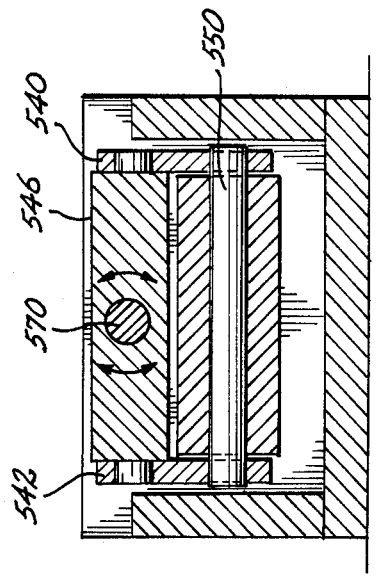

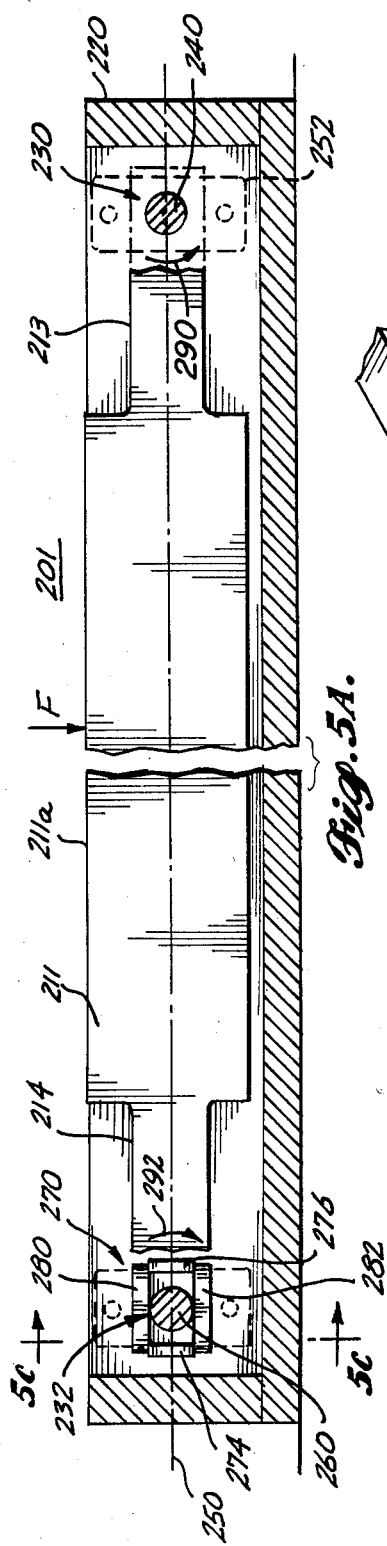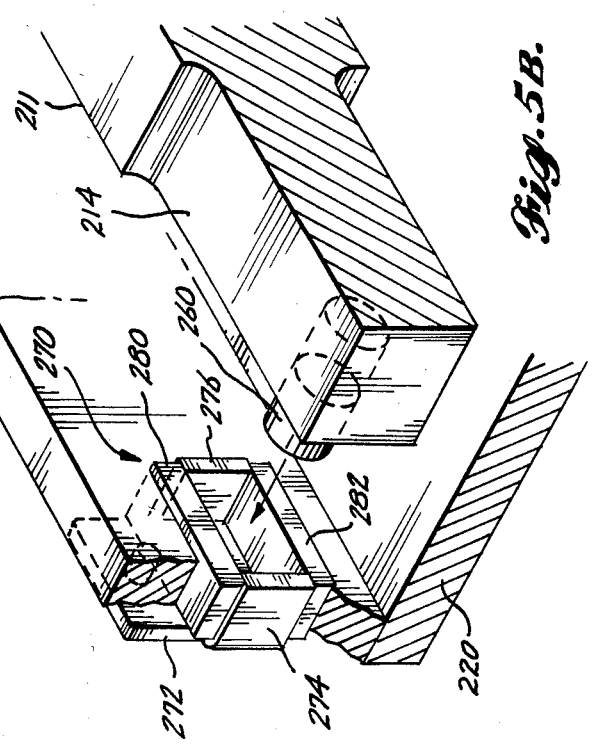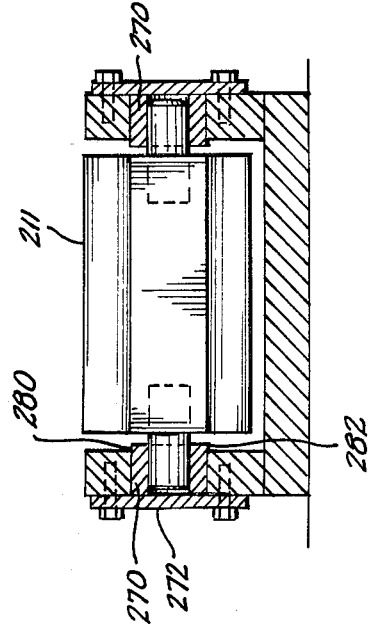

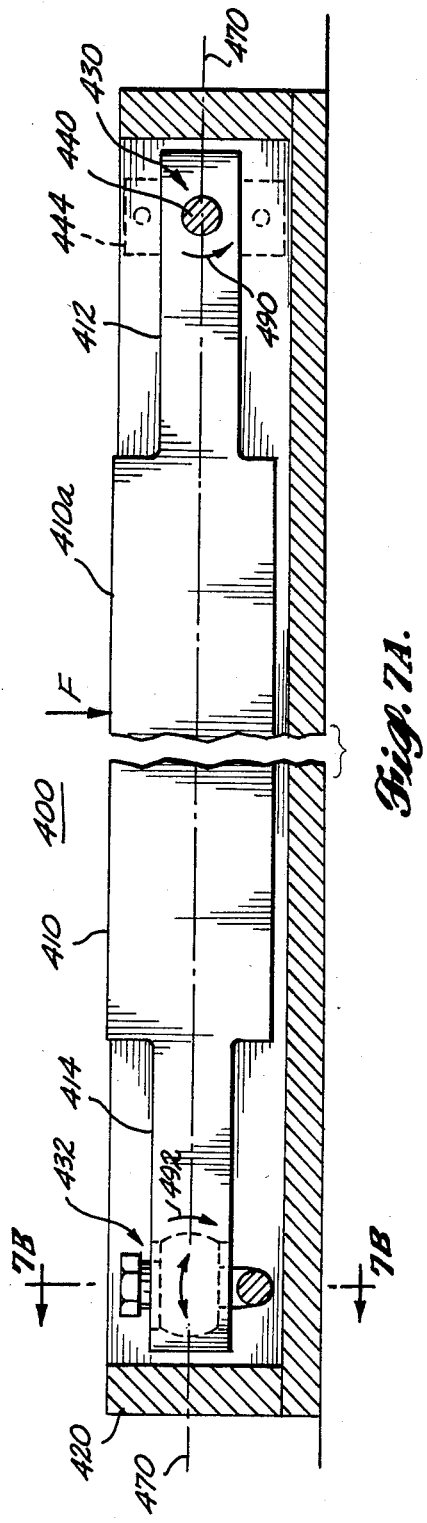
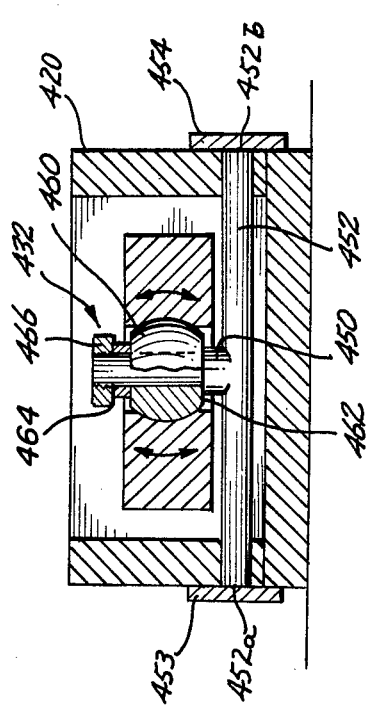

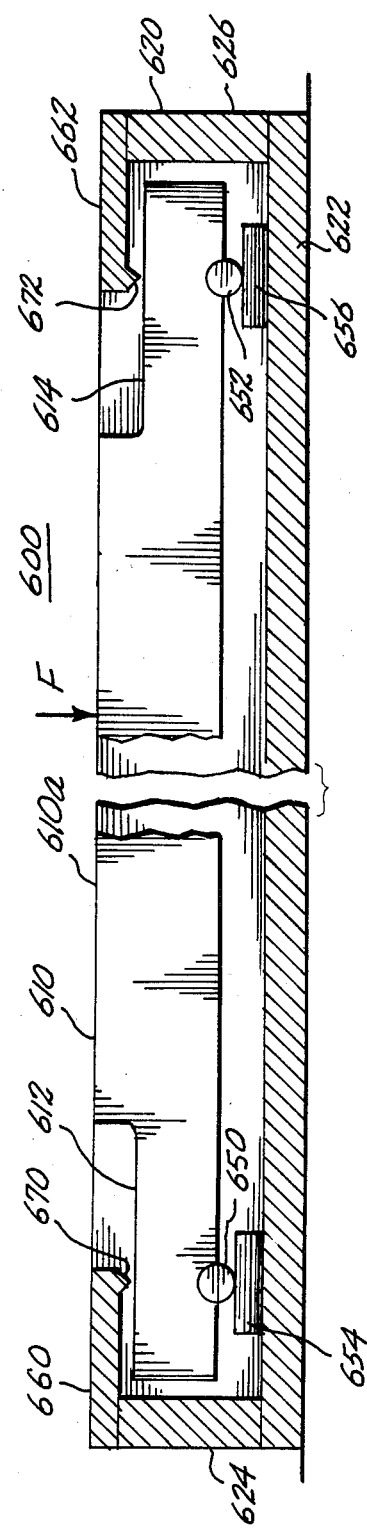

VEHICLE PLATFORM SCALE

BACKGROUND OF THE INVENTION

The present invention pertains to the platform scale art and, more particularly, to an improved platform scale of the type having strain gauge load sensors mounted to a deflectable load scale.

Platform scales for use in measuring the axle load of vehicles, such as commercial load carrying trucks, are well known to the art.

In one commonly found platform scale construction, the wheels of the vehicle are positioned on a weighbridge platform. The load on the platform is transmitted to a load cell housed within a tray mounted beneath the platform. The load cell employs a beam element that is supported at either end with respect to the tray. The load on the platform is transmitted to the central portion of the beam, producing a rotational displacement of the beam about its tray supports. The deflection or shear displacement of the beam is monitored by one or more strain gauge transducers affixed thereto. The transducers produce output electrical signals which may be suitably summed and scaled for application to an electronic readout, indicating the total weight on the platform.

Each wheel or wheel group of a vehicle may be sequentially weighed in this manner or, in the alternative, multiple weighbridge platforms may be provided, such that all wheels are positioned on weighbridge platforms simultaneously.

In one particular prior art platform scale assembly, an elongate load cell has semicylindrical grooves provided in the undersurface of each end thereof. The grooves are positioned on bearing rods that ride on load cell plates affixed to the floor plate of the load cell tray. A weighbridge platform is affixed to the load cell and tray assembly such that a load on the bridge is transmitted to the load cell at a portion intermediate the bearing rods, thereby creating a rotational displacement of the load cell about the bearing rod pivot points. This displacement produces an output signal on bending moment strain gauge transducers affixed to the undersurface of the load cell.

To prevent the load cell from being lifted out of its tray, a pair of retaining plates are affixed to the top surface of either end of the load cell tray. The retaining plates are positioned such that either end of the load cell, upon being lifted off of its pivot, is constrained by its corresponding retaining plate.

The aforedescribed vehicle platform scale assembly is subject to an inaccuracy when a vehicle is positioned at one edge of the platform. Such an off-centered loading may result in a moment being applied to the load cell causing tilting thereof, with one end of the load cell engaging its retaining plate. In this event, the readings from the strain gauges may not accurately reflect the vehicle load on the platform due to three factors. First, a tilt of the load cell's longitudinal axis away from the horizontal plane introduces a "cosine $\theta$" error. That is, if the load cell deviates by an angle $\theta$ from the horizontal, its deflection in response to a transmitted load is reduced by a factor related to cosine $\theta$. This reduced deflection, as sensed by the strain gauge transducers, produces a reading less than the actual weight of the load.

A second source of error produced by a tilt of the load cell within its tray such that one end thereof bears on its retaining plate results from a repositioning of the load cell pivot points and corresponding beam length variances. That is, the load cell is calibrated using a fixed load which produces a corresponding deflection of the load cell about its bearing rod pivot points. The resulting signal produced by each bending moment strain gauge transducer is a function of the beam length from the transducer mounting point to the load cell pivot point. For the condition wherein one end of the load cell is lifted off of its bearing rod pivot and contacts the underside of the retaining plate, and is now pivoting about some indeterminate point on the retaining plate, the beam length changes, producing a corresponding change in the transducer output.

A third source of inaccuracy caused by tilt of the aforedescribed load cell within its tray is due to the asymmetrical configuration of the load cell in its vertical dimension. As a result of this asymmetry, the neutral axis of the load cell moves when the pivot point thereof displaces from the underside to the top surface of the load cell. Such a skewing of the load cell's neutral axis produces a change in the stress levels at the locations of the strain gauge transducers and, correspondingly, introduces an error into the transducer-produced signals.

SUMMARY OF THE INVENTION

It is an object of the present invention, therefore, to provide an improved vehicle platform scale employing load cell assemblies, which load cell assemblies are not subject to the above-described potential inaccuracies.

Briefly, according to the invention, a scale, including a load-bearing surface, has a load cell assembly that is comprised of a deflectable load cell, a support for the load cell, and suspension means for suspending the load cell from the load cell support. The load-bearing surface is mounted to the load cell assembly such that a load on the load-bearing surface is transmitted to the load cell resulting in a predetermined strain condition thereof. Strain transducers are mounted to the load cell for producing an output signal corresponding to this strain condition. The load cell suspension means includes first and second pivots located at spaced-apart portions of the load cell for producing rotational deflective motion of the intermediate portion of the load cell about the first and second pivots in response to a transmitted load-bearing surface load. The pivoting axis of each of the first and second pivots is positioned within an axial plane of the load cell, the axial plane being neutral to both tensive and compressive transmitted load-bearing surface loads.

Preferably, the load cell is shaped symmetrically about an axial plane normal to a transmitted load-bearing surface load with the suspension first and second pivots being positioned such that the pivoting axes thereof are within the axial plane.

In a first preferred construction of the invention, the first and second pivots comprise pins that project from the load cell at the spaced-apart portions. The axial axes of the pins are positioned within the neutral axial plane, the pins being received within seats provided in the load cell support. The seats are conformed to the surface of the pins such that the pins may rotate within, while being constrained from translational displacement with respect to the seats.

In an alternative embodiment of the invention, the first pivot includes means for constraining a first end of the load cell from translational displacement in a plane normal to the transmitted load-bearing surface load. Preferably, this first pivot means comprises a pair of first pins projecting from opposite sides of the first end of the load cell, the axial axes of the first pins being aligned within the neutral axial plane. The first pins are received within seats provided in the load cell support, the seats being conformed to the surfaces of the first pins such that the pins may rotate within, while being constrained from translational displacement with respect to the seats. The second pivot includes a means for constraining a second end of the load cell from translational displacement in a direction parallel to the pivoting axis of the second pivot, permitting translational displacement of the second end in a direction orthogonal to the pivoting axis and within the neutral axial plane. This second pivot means is preferably comprised of a pair of second pins that project from opposite sides of the second end of the load cell. The axial axes of the second pins are aligned with the neutral axial plane. The load cell support includes tracks for receiving and guiding the second pins, the tracks constraining the second pins from translational displacement in a direction parallel to the pivoting axis of the second pivots while permitting translational displacement of the second pins in a direction orthogonal to the pivoting axis and within the neutral axial plane, and further permitting rotational displacement of the second pins within the track means. In this manner, translational displacement of the second pivot allows the distance between the first and second pivots to vary with deflection of the load cell.

In a yet further embodiment of the invention, the first pivot includes means for constraining the first end of the load cell from translational displacement in a plane normal to the transmitted load-bearing surface load while permitting rotational displacement of the first end with respect to the load cell support. This first pivot means is preferably comprised of a ball and socket assembly, wherein a ball is mounted in a fixed position to the load cell support, the ball being received in a socket provided in the first end of the load cell such that the first end is free to rotate about the ball while being constrained from translational displacement in a plane normal to the transmitted load-bearing surface load. The second pivot includes means for constraining a second end of the load cell from translational displacement in a direction parallel to the pivoting axis of the second pivot and permits translational displacement of the second end in a direction orthogonal to the pivoting axis and within the neutral axial plane. The second pivot is preferably comprised of a pair of pins projecting from opposite sides of the second end of the load cell. The axial axes of the pins are aligned within the neutral axial plane. The load cell support includes tracks for receiving and guiding the pins, the tracks constraining the pins from translational displacement in a direction parallel to the pivoting axis of the second pivot while permitting translational displacement of the pins in a direction orthogonal to the pivoting axis and within the neutral axial plane, and further permitting rotation of the pins within the tracks. This embodiment permits a twisting moment on the load cell support to be shed by rotational displacement of the first pivot, with translational displacement of the second pivot allowing the distance between the first and second pivots to vary with deflection of the load cell.

In another embodiment of the invention, the first pivot includes means for constraining a first end of the load cell from translational displacement in a plane normal to the transmitted load-bearing surface load. This first pivot means is preferably comprised of a pair of pins projecting from opposite sides of the load cell first end. The axial axes of the pins are aligned within the neutral axial plane. The pins are received within seats provided in the load cell support. These seats are conformed to the surfaces of the pins such that the pins may rotate within, while being constrained from translational displacement with respect to the seats. A second pivot includes means for constraining a second end of the load cell from translational displacement in a direction parallel to the axial axis of the second pivot, while permitting both translational displacement of the second end in a direction orthogonal to the axial axis and within the neutral axial plane and rotational displacement of the second end of the load cell with respect to the load cell support. The second pivot is preferably comprised of a pivotable ball and socket assembly wherein a ball is mounted to the load cell support on a pivot, which pivot permits displacement of the ball in a direction orthogonal to the axial axis of the second piviot. The ball is received within a socket provided in the second end of the load cell such that the second end is free to rotate about the ball. In this embodiment, a twisting moment on the load cell support is shed by rotational displacement of the second pivot. Further, the second pivot allows the distance between the first and second pivots to vary upon deflection of the load cell.

In yet a further embodiment of the invention, the load cell suspension comprises first and second shackles, each shackle being pivotally mounted at a first end thereof to the load cell support. The first shackle is pivotally mounted at a second end to a first end of the load cell thereby forming the first pivot. The second shackle is pivotally mounted at a second end to a second end of the load cell to form the second pivot. The pivots of the shackles constrain the load cell from translational displacement in a direction parallel to the axial axis of the first and second pivots, while permitting the distance between the first and second pivots to vary with deflection of the load cell.

Preferably, the first shackle is secured to the load cell support by a gimballed support. The gimballed support is freely rotatable with respect to the load cell support on an axis orthogonal to the axial axis of the first and second pivots. In this way, a twisting moment on the load cell support is shed by rotation of the gimballed support.

In yet a further embodiment of the invention, an improvement is provided in a scale of the type wherein a load on a load-bearing surface is transmitted to a load cell producing a corresponding rotational deflective motion thereof about spaced-apart supports. The load cell deflective motion is sensed by strain transducers affixed thereto. The load cell is housed within a tray having a pair of retaining plates, each retaining plate positioned on the tray to limit the displacement of an end of the load cell off of a corresponding support, as caused by a load being miscentered on the load-bearing surface. The improvement comprises a pair of stop members, each stop member forming the contact point between one of the retaining plates and a corresponding end of the load cell upon displacement of the load cell end off of its support. The stop members are predeterminedly positioned such that the deflective motion sensed by the strain transducers is substantially the same as would otherwise be sensed by the strain transducers in response to the load being properly centered on the load-bearing surface such that neither end of the load cell is displaced off of its corresponding support.

The above, and other aspects of the invention will be more fully understood with reference to the specification and drawings.

BRIEF DESCRIPTION OF THE DRAWINGS

FIG. 4 is a perspective, partial view illustrating the preferred embodiment of the symmetrical load cell for use with a shear web-type strain gauge;

FIG. 5A is a side elevational view of the preferred embodiment of the load cell assembly having a sliding pin pivot at one load cell end and a fixed pivot at the remaining load cell end;

FIG. 5B is a perspective, partial end view of the preferred construction of the sliding pin pivot as shown in FIG. 5A;

FIG. 5C is an end elevational view of the sliding pin pivot construction shown in FIG. 5A;

FIG. 7A is a side elevational view of the preferred embodiment of the invention employing a fixed pivot at one load cell end and a pivoting ball and socket pivot at the remaining load cell end;

FIG. 7B is an end elevational view of the pivoting ball and socket pivot shown in FIG. 7A;

FIG. 8A is a side elevational view illustrating the preferred embodiment of the invention employing shackle pivots at each end of the load cell, the shackles being gimbal-mounted to the load cell tray at a first end of the load cell;

FIG. 8B is an end elevational view of the gimballed shackle arrangement shown in FIG. 8A; and FIG. 9 is a side elevational view illustrating an improvement in the load cell assembly known to the prior art wherein provided up-stops define the pivot point of a load cell end which lifts off of its bearing rod.

DETAILED DESCRIPTION

Figure 1:
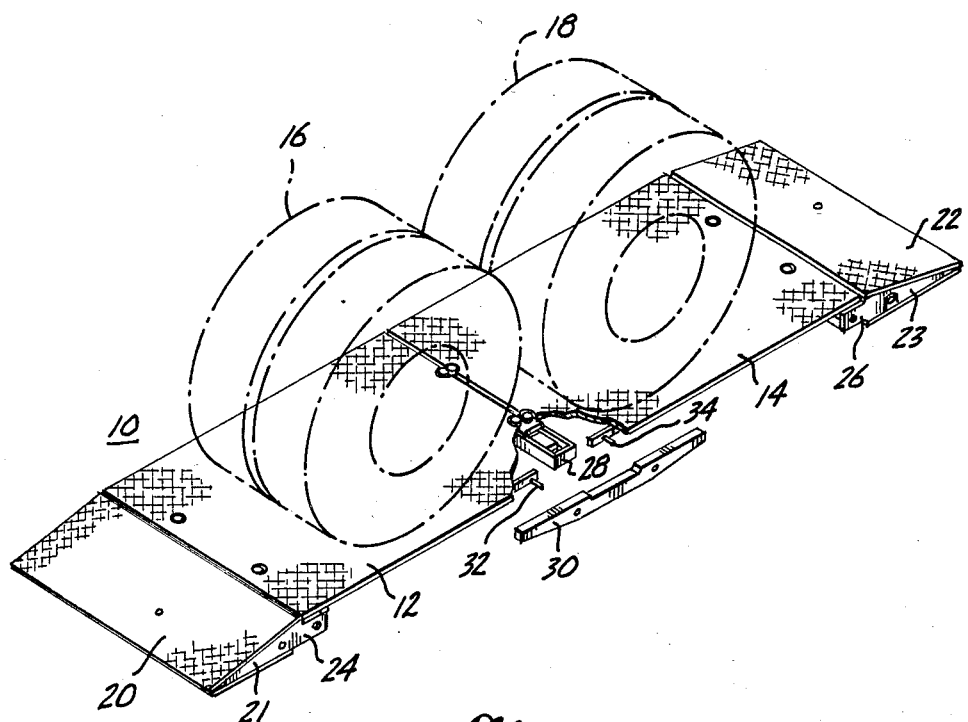
FIG. 1 is a perspective view illustrating a vehicle platform scale employing load cell assemblies.

FIG. 1 is a perspective view illustrating a vehicle platform scale 10, known to the prior art and described, for example, in U.S. Pat. No. 4,281,728, issued Aug. 4, 1981 and assigned to the same assignee as the present application. Here, the vehicle platform scale 10 is comprised of a pair of weighbridge platforms 12, 14. Shown, in phantom, on the weighbridge platforms 12, 14 are two wheel pairs 16, 18 of a conventional dual-axle truck tractor or trailer. The vehicle's tires are positioned on the weighbridge platforms 12, 14 via a pair of approach ramps 20, 22. The approach ramps 20, 22 are supported by outer wedge-shaped sidewalls 21, 23 respectively, and corresponding sidewalls at the opposite end of the approach ramps 20, 22 (not shown) as well as internal supports (not shown).

The vehicle platform scale 10 is provided with three load cell assemblies: two end load cell assemblies 24, 26 and a central load cell assembly 28. The various load cells 24, 26, and 28 are identical in construction, differing only in the details of mounting each load cell to the platforms 12, 14 and in electrical harness provisions.

The two weighbridge platform assemblies 12, 14 are joined by a restraining bar 30 having provided holes that receive shafts 32, 34 that are affixed to the weighbridge platforms 12, 14, respectively. A restraining bar (not shown) identical to restraining bar 30 is affixed to shafts (also not shown) on the opposite side of the weighbridge platforms 12, 14.

The restraining bars, such as restraining bar 30, may be affixed to the shafts, such as shafts 32 and 34, by cotter pins (not shown) or other suitable securing means.

Figure 2:
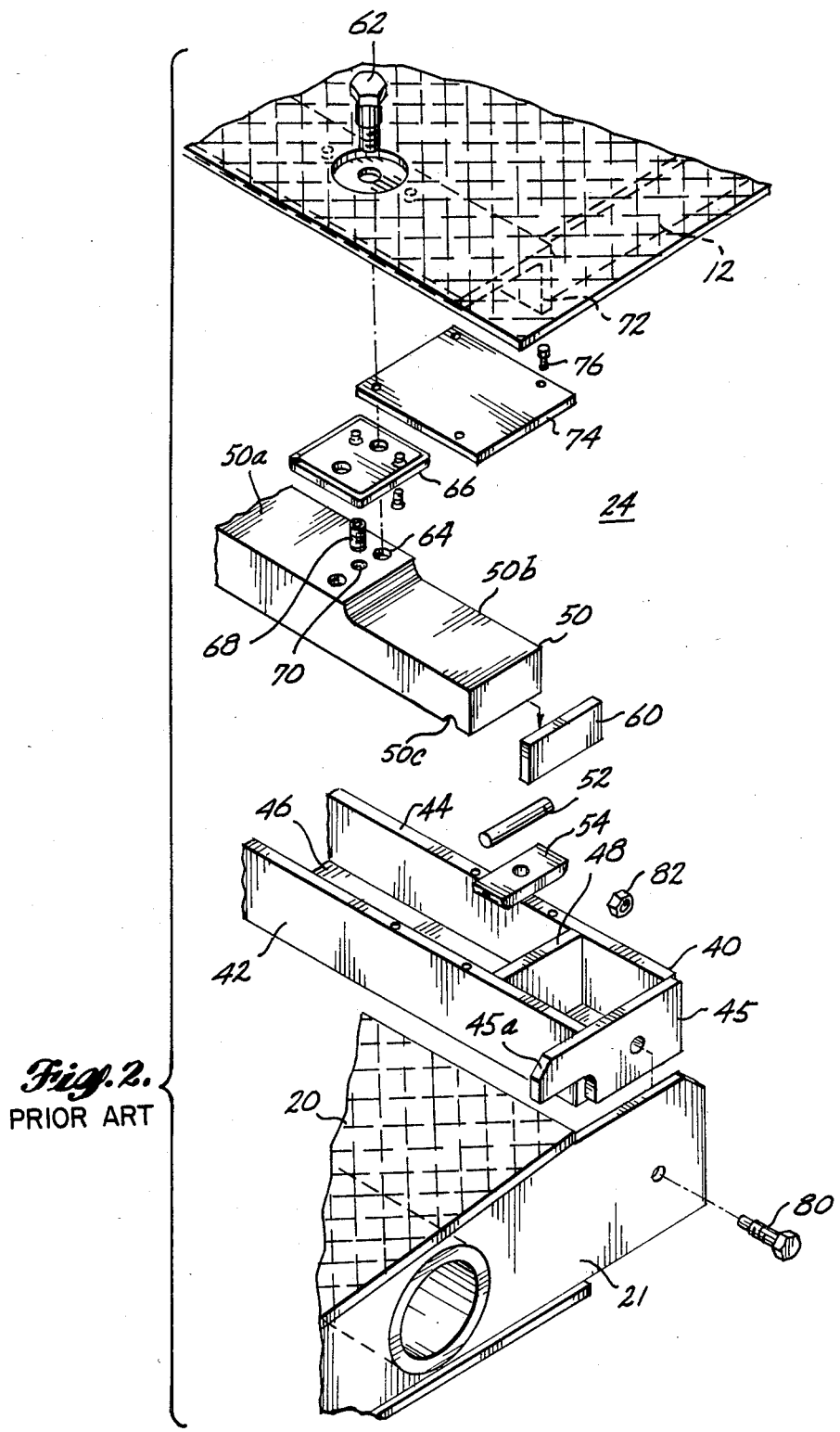
FIG. 2 is an exploded, end view illustrating construction of the vehicle platform scale shown in FIG. 1, and illustrating the load cell assembly known to the prior art.

FIG. 2 is an exploded, end view of the load cell 24 shown in FIG. 1. It is understood that the remaining load cells 26, 28 of FIG. 1 are similar in construction.

The load cell assembly 24 includes a load cell tray 40. Load cell tray 40 is substantially rectangular in shape having parallel sidewalls 42, 44, a pair of parallel endwalls, such as endwall 45 and a floor plate 46. A pair of interior endwalls such as endwall 48, along with sidewalls 42, 44 and floor plate 46 define an upwardly opening cavity that receives a load cell 50.

Load cell 50 is formed from an elongate, solid block of steel machined with a planar upper surface 50a, and tapered end portions, one of which is shown at 50b. Transverse, semicylindrical grooves such as groove 50c are formed at the end of each undersurface of load cell 50.

Load cell 50 is supported within load cell tray 40 via bearing rods, such as rod 52, that ride in the semicylindrical grooves, such as groove 50c and bear upon bearing plates, such as plate 54. The bearing plates have a flat upper surfaces, curved lower surfaces, to relieve load cell 50 from twists on tray 40 and are affixed to the floor plate 46 of load cell tray 40 via a securing bolt (not shown).

Rubber bumpers such as bumper 60 are positioned between the ends of load cell 50 and the opposing faces of the interior walls such as wall 48.

The weighbridge platform 12 is affixed to the load cell assembly 24 via bolts, such as bolt 62, that mount through holes in weighbridge platform 12 and are received in threaded holes, such as hole 64 in the load cell 50. Interposed between load cell 50 and the weighbridge platform 12 are top bearing plates such as plate 66 provided with aligned holes for receiving the shank of the bolts, such as bolt 62. Load cell buttons, such as button 68, rest in holes, such as hole 70, provided in the upper surface 50a of load cell 50, and are positioned to abut the lower surface of top bearing plates, such as plate 66. The top bearing plates, such as plate 66, are mounted to an angle bar 72 that provides supporting substructure to weighbridge platform 12.

A pair of retaining plates, such as plate 74, are affixed via screws, such as screw 76, to the top surface of load cell tray 40, and are positioned over the ends, such as end 50b of the load cell 50.

The entry ramp 20, and associated sidewall 21 pivotally mount to the load cell 40 via a bolt 80 and nut 82 that are secured through aligned holes in the sidewall 21 and exterior endwall 45 of the load cell 40. An extended portion 45a of the exterior endwall 45 serves to support the end ramp 20 in a horizontal position when the scale is lifted, such as during transport of the vehicle platform scale unit.

In operation, a load on the weighbridge platform 12 is transmitted through the top bearing plates, such as plate 66, and load cell buttons, such as button 68, to the load cell 50. In response to the applied load, load cell 50 rotationally displaces about its bearing rods, such as bearing rod 52. This displacement is monitored by bending moment strain gauge transducers (not shown) mounted to the undersurface of load cell 50. Acting in the known manner, the strain gauge transducers produce electrical output signals that may be suitably processed to produce a display of the total load on the load cell 50.

The prior art load cell assembly 24 of FIG. 2 has been found to exhibit inaccuracies due to conditions that create a tilting moment to the load cell 50. For example, a vehicle load that is miscentered on the weighbridge platform 12 such that it is on the leftmost edge of the platform will create a loading on load cell 50 tending to raise tapered end portion 50b off of the bearing rod 60. A sufficiently large tilting moment on beam 50 causes tapered end portion 50b to engage the retaining plate 74.

As described hereinabove, the tilting of load cell 50 creates inaccuracies in the outputs of the strain gauge transducers as a result of three different factors. First, tilting of the load cell 50 out of the horizontal plane reduces the strain on load cell 50 as sensed by the strain gauge transducers by a factor related to the cosine of the tilt angle of load cell 50 from horizontal.

Secondly, the signal produced by the strain gauge transducers is related to the length from each transducer to the pivot point of load cell 50. When load cell 50 raises off of its calibrated pivot corresponding to bearing rod 52, and engages the retaining plate 74, a new pivot point, and corresponding beam length to each strain gauge transducer, is created, thereby inducing errors in the signals produced by the strain gauge transducers.

Further, it should be noted that the prior art load cell 50 is asymmetrical about a horizontal plane through the longitudinal axis thereof. As a result, the neutral axis of load cell 50 displaces in response to the bearing point of load cell 50 moving from bearing rod 52 to a contact point on the retaining plate 74. Displacement of the load cell's neutral axis produces a variation in the stress loads at the locations of the strain gauge transducers. This stress load variance, also, contributes to an inaccuracy in the output from the strain gauge transducers.

An additional, but lesser inaccuracy introduced by the prior art load cell assembly 24 of FIG. 2 results from the fact that the load cell 50 is constrained in the longitudinal direction only by rubber bumpers, such as rubber bumper 60. In the event a load cell 50 rolls on its bearing rods, such as bearing rod 52, to forcibly engage a rubber bumper, such as rubber bumper 60, a portion of the load applied to load cell 50 may be carried through rubber bumper 60 to the load cell tray 40, thereby reducing the rotational deflection of load cell 50 and producing a reduced reading as sensed by the strain gauge transducers.

The present invention is directed to improved load cell assemblies that substantially reduce, or eliminate the inaccuracies described above.

The following FIGURES illustrate various preferred embodiments of the improved load cell assembly according to the invention. These preferred embodiments were designed specifically to replace the load cell assembly 24 of FIG. 2, but it should be understood that the improved load cell assembly construction shown herein may be modified for use in any load cell dependent system.

Figure 3A:
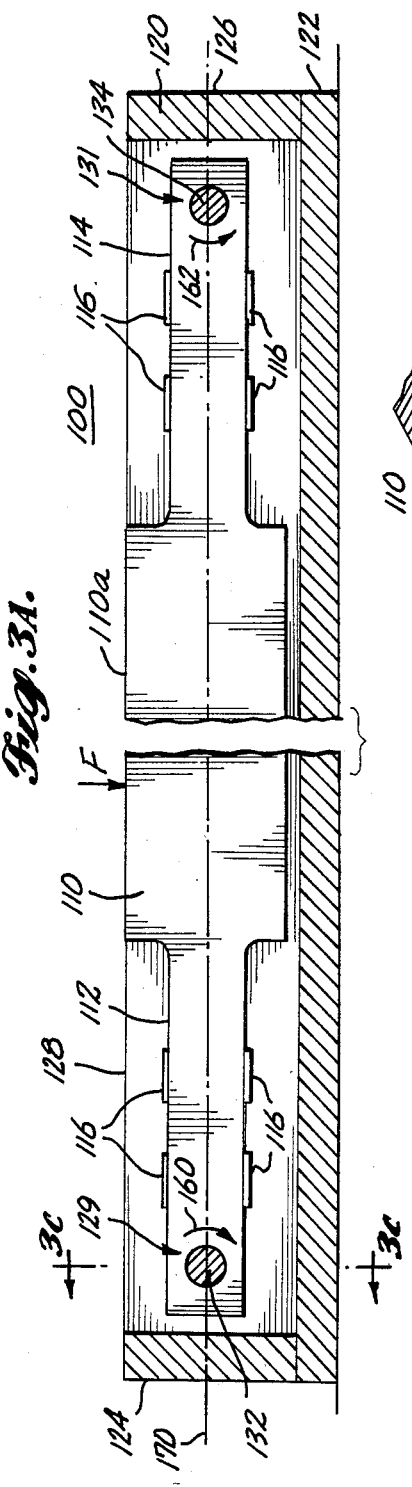
FIGS. 3A through 3C are side elevation, perspective, and end elevation views, respectively, of a preferred embodiment of the improved load cell assembly, illustrating the use of fixed pivot pins at each end of the load cell.
Figure 3B:
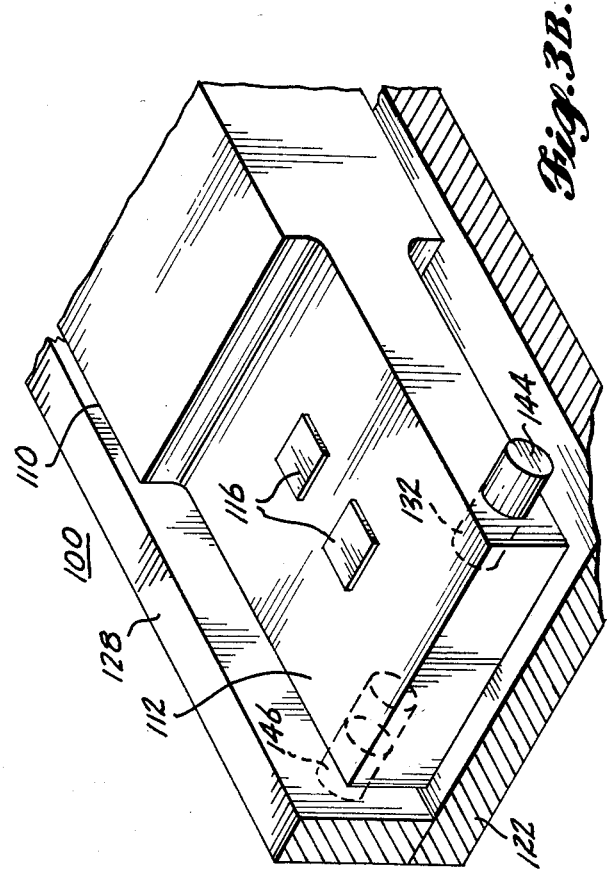
Figure 3C:
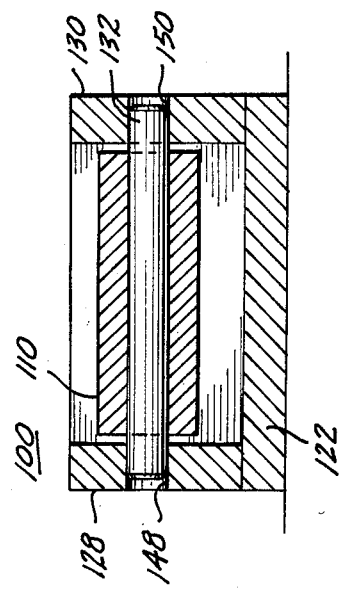

FIGS. 3A through 3C illustrate one preferred embodiment of the present improved load cell assembly. In particular, FIG. 3A is a side elevational view of a symmetrical load cell suspended within a load cell tray via first and second fixed pivots. FIG. 3B is a perspective, end view of the load cell assembly shown in FIG. 3A; and, FIG. 3C is an end elevation view of the load cell assembly of FIG. 3A.

Referring to FIGS. 3A through 3C, shown is a load cell assembly 100 comprised of a load cell 110 received within, and suspended from a load cell support, or tray, 120.

The load cell 110, preferably formed from a steel alloy such as A.I.S.I. No. 4340 or other suitable load cell material, is machined such that it has a substantially rectangular central portion, as viewed from the side and the top, with first and second extended end portions 112, 114, respectively. The vertical dimension of the end portions 112, 114 is reduced from that of the central portion.

Affixed to the upper and/or lower surfaces of the first and second end portions 112, 114 are bending moment strain gauge transducers 116.

The tray 120, formed of a mild steel such as A.S.T.M. A36 or other suitable tray material, is a five-sided box, having an open end for receiving the load cell 110. The box has a floor plate 122, first and second vertically standing endwalls 124, 126 and vertically standing sidewalls 128, 130.

The load cell 110 is suspended from the tray 120 via first and second pivots 129, 131 provided at the first and second end portions 112, 114 of the load cell 110. In this embodiment of the invention, the first and second pivots 129, 131 are provided by first and second pins 132, 134, respectively, that are press-fit, or secured by other suitable means within bores through the first and second end portions 112, 114. The ends of each pin, such as ends 144, 146 of first pin 132, project a sufficient distance outward from the vertical sides of the first and second end portions 112, 114, such that they completely fill seats, such as seats 148, 150, in the sidewalls 128, 130 of the tray 120. The seats, such as seats 148, 150, in this embodiment of the invention are comprised of bores having a diameter suitable for receiving the outer surface of first and second pins 132, 134.

In operation, a load on a load-bearing surface, such as a vehicle weighbridge platform (not shown), is transmitted to the upper surface 110a of the central portion of load cell 110. This load is represented by a downward-pointing arrow F on upper surface 110a. In response to the applied load, that portion of load cell 110 intermediate first and second pins 132, 134 is caused to rotationally displace about the first and second pivots 129, 131 formed by first and second pins 132, 134 and the corresponding seats, such as seats 148, 150. This rotational displacement is indicated by arrows 160, 162. The resulting strain on load cell 110 is sensed by bending moment strain gauge transducers 116, that respond by producing electrical output signals which may be processed in the conventional manner to produce a reading of the load on the load cell 110.

A particular feature of the load cell assembly 100 construction as shown in FIGS. 3A through 3C is that the load cell 110 is shaped symmetrically about an axial plane (the edge of which is shown at 170) which is normal to a transmitted load-bearing surface load F. In addition, the pivoting axes of first and second pins 132, 134 are positioned in this axial plane 170. As a result, axial plane 170 defines the neutral axis of load cell 110 for both tensive and compressive transmitted loads F. Thus, a transmitted load-bearing surface load that tends to tilt load cell 110, such as by raising first end portion 112, produces a limited shift in the neutral axis of the load cell 110, thereby reducing inaccuracies in the outputs from the bending moment strain gauge transducers 116 that would otherwise occur.

In addition, inasmuch as the seats, such as seats 148, 150, are conformed to the outer surface of the first and second surface of the first and second pins 132, 134, the pins are constrained from translational displacements. As such, a tilting moment on the load cell 110 does not allow an end of the load cell 110 to lift off of its pivot, thereby eliminating the aforedescribed cosine $\theta$ type errors, or errors caused by an end of the load cell engaging a retaining plate thereby changing the beam lengths to each strain gauge transducer 116.

A further feature of the improved load cell assembly shown in FIGS. 3A through 3C is that inasmuch as the seats, such as seats 148, 150, restrain the load cell in its longitudinal direction, there is no need for the use of elastic elements, such as the rubber bumper 60 of FIG. 2, thereby avoiding any errors created by the use of such elements.

An additional feature of the invention is that the bending moment strain gauge transducers 116 may be mounted to both the upper and the lower surfaces of the first and second end portions 112, 114. By so mounting the transducers 116, both tensive and compressive forces within load cell 110 are sensed, and the resultant electrical output signal from the transducers 116 is substantially larger than the output of the transducers used on only the undersurface of the load cell assembly of FIG. 2.

FIG. 4 is a perspective, end view of an alternative construction of the load cell for use in the improved load cell assembly as depicted in FIGS. 3A through 3C. Here, however, the load cell 200 is rectangular in each of its three dimensions. As with the load cell construction of FIGS. 3A through 3C, pins, such as pins 202, 204 project from either side face of the load cell 200. The pivotal axes of the pins are positioned within the neutral axis of the load cell 200.

Here, however, rather than using bending moment strain gauge transducers, load cell 200 is provided with flat-bottomed bores, such as bores 206, 208, that extend into the central portion of load cell 200 at either end thereof. The center point of each bore 206, 208 is within the neutral axis plane of the load cell 200. Affixed within the bores 208, 206 are shear web strain gauges 210, 212. The shear web strain gauges 210, 212, of conventional design, and thusly positioned produce output signals corresponding to the shear forces in load cell 200.

It should be understood that any of the embodiments of the invention described herein could employ shear web strain gauges.

A potential problem with the load cell assembly depicted in FIGS. 3A through 3C is that each of the load cell pivots is constrained from translational movement, whereby a displacement on the load cell does not permit a change in the distance between the support points. By not providing relief for the tendency of the pivot point distance to vary with applied loads, the pivot pins might tend to bind, or create excessive wear to portions of the seats. In addition, differences in the coefficients of thermal expansion between the tray and the load cell produce error forces that are transmitted to the strain gauge transducers, thereby producing inaccuracies.

The improved load cell assembly depicted in FIGS. 5A through 5C provides a means to eliminate such errors.

FIG. 5A is a side elevation view of a load cell assembly illustrating suspension of the load cell from the tray via both a constrained pivot and a sliding pivot; FIG. 5B is an end, perspective view of the sliding pivot arrangement shown in FIG. 5A; and, FIG. 5C is an end, elevation view of the sliding pivot as shown in FIG. 5A.

Referring to FIGS. 5A through 5C, the improved load cell assembly 201 is comprised of a load cell 211 and a load cell support, or tray, 220. As with the load cell assembly of FIGS. 3A through 3C, the load cell 211 is made from a steel alloy, or other material selected for the particular application. It is machined to include a central portion, which is rectangular as viewed from the side and the top, and first and second extended end portions 213, 214. The vertical dimension of the end portions 213, 214 is less than that of the central portion of load cell 211. Bending moment strain gauge transducers (not shown) may be provided on the upper and lower surface of first and second end portions 213, 214.

As with the load cell assembly construction of FIGS. 3A through 3C, the load cell support, or tray 220 is a five-sided box, having an upward opening for receiving the load cell 211.

The load cell 211 is suspended from the load cell support 220 via first and second pivots 230, 232, respectively. The first pivot 230 is comprised of a pin 240 that is press-fit within a bore provided in the first end 213 of load cell 211. The pivoting axis of pin 240 is within the neutral axial plane, the edge of which is shown at 250, of the load cell 211. The portions of the first pin 240 that project beyond the side surfaces of the first end portion 213 are received within brackets, such as the brackets shown dotted at 252, which are affixed to the side surfaces of load cell support 220. The brackets, such as bracket 252, are provided with an aligned hole for receiving and supporting the projecting portions of the first pin 240. The brackets, such as bracket 252, provide an alternative means to support and constrain the pins, such as pin 240, to that method shown in FIGS. 3A through 3C wherein bores are provided in the sidewalls of the tray 220. The use of hardened brackets may be dictated, for example, in applications wherein the material used to form tray 220 is insufficient to support the loads applied to the pin 240.

The second pivot 232 is comprised of a second pin 260 that is press-fit within a bore provided through the second end portion 214 of load cell 211. Second pin 260 has a pivoting axis that is aligned within the neutral axial plane 250 of load cell 211.

The projecting portions of the pin 260 on either side of second end portion 214 are received within tracks 270 provided within the sidewalls of the tray 220.

Referring to FIG. 5B, each track 270 is comprised of a bracket 272 having a central portion that may be affixed by a bolt, or other suitable means to the sidewall of the support tray 220, and bent-eared portions 274, 276 that form the endwalls of the track. Upper and lower bearing tracks 280, 282, respectively, are affixed to the ear portions 274, 280. The upper and lower tracks 280, 282 are formed of a hardened material, such as a material of a Rockwell hardness C40–45. The upper and lower tracks 280, 282 are spaced apart such that they receive the diameter of and guide pin portion 260, constraining pin portion 260 from translational displacement in a direction parallel to an applied force F on load cell 211. Further, the depth of the tracks 280, 282 constrains the second end portion 214 of load cell 211 from translational displacements in a direction along the pivoting axis of pin 260.

In operation, a load from a load-bearing surface is transmitted to the upper planar surface 211a of the load cell 211. This load is represented by a downward pointing arrow F. The transmitted load results in a rotational displacement of load cell 211 about its first and second pivots 230, 232, these rotational displacements being indicated by arrows 290, 292, respectively. The sliding second pivot 232 allows the distance between first and second pivots 230, 232 to vary with deflection of the load cell 211. In addition, strains that develop between the load cell 211 and tray 220 resulting from differing coefficients of thermal expansion or slight load cell tray 220 bending are relieved by translation afforded by the second pivot 232.

As with the improved load cell assembly construction of FIGS. 3A through 3C, the load cell assembly 201 of FIGS. 5A through 5C eliminates errors due to transmitted forces tending to tilt the load cell 211 within the tray 220. That is, inasmuch as the pivoting axes of first and second pivots 230, 232 are within the approximate neutral axis 250 of load cell 211, and inasmuch as load cell 211 is approximately symmetrical about its neutral axis 250, neutral axis 250 remains relatively stable for both tensive and compressive forces on load cell 211.

In addition, the first and second pivots 230, 232 are constructed such that the first and second end portions 213, 214 are constrained from translational displacement off of their pivot points, thereby eliminating the cosine θ-type error, or errors due to a changing pivot point and corresponding beam length variances from the pivot to the strain gauge transducers (not shown).

In addition, inasmuch as the first pivot 230 constrains the load cell 211 from overall longitudinal translation, the construction of FIGS. 5A through 5C eliminates the need for the elastic bumper element 60 of the prior art load cell assembly 24 shown in FIG. 2 and any errors resulting from the use thereof.

Figure 6A:
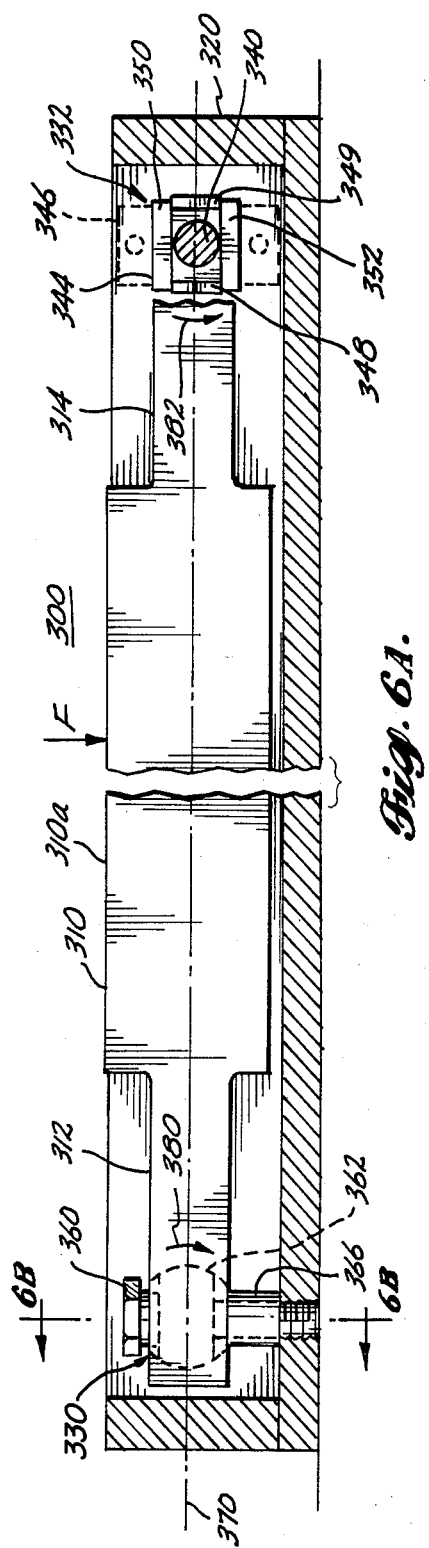
FIG. 6A is a side elevational view of the preferred embodiment of the load cell assembly employing a fixed position ball and socket pivot at one load cell end and a sliding pin pivot at the remaining load cell end.
Figure 6B:
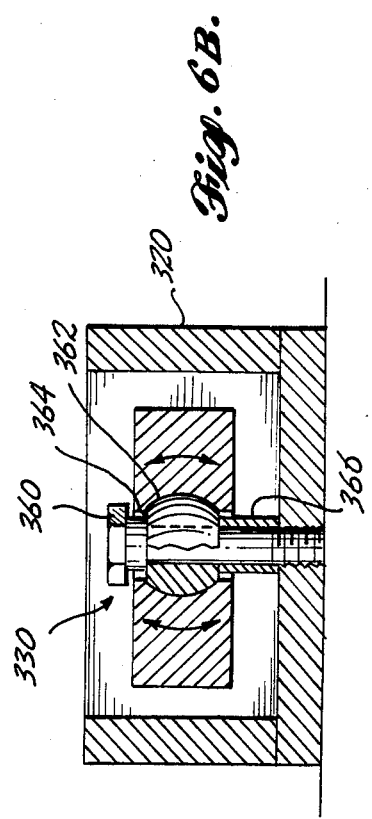
FIG. 6B is an end elevational view of the ball and socket pivot shown in FIG. 6A.

FIGS. 6A and 6B depict a further embodiment of the improved load cell assembly. More specifically, FIG. 6A is a side elevational view illustrating a load cell suspended from a load cell support by a first pivot, comprised of a ball and socket assembly, and a second pivot comprised of a sliding pin. FIG. 6B is an end elevational view illustrating additional details of the ball and socket first pivot shown in FIG. 6A.

Referring to FIGS. 6A and 6B, an improved load cell assembly 300 is comprised of a load cell 310 and a load cell support, or tray, 320. Load cell 310 is formed of a suitable metal alloy, or other appropriate load cell material for the expected loads, and is machined to have a central, rectangular portion as viewed from above and the side, and first and second end portions 312, 314, respectively. The vertical dimension of the first and second end portions 312, 314 is less than that of the central portion.

The tray 320 is a five-sided box, having an upward facing opening for receiving the load cell 310.

The load cell 310 is suspended from the tray 320 by a first pivot 330 at the first end portion 312 and a second pivot 332 at the second end portion 314.

The second pivot 332 is identical to the sliding pin pivot 232 as shown in FIGS. 5A through 5C. Thus, a pin 340 is press-fit within a bore provided in the second portion 314 of load cell 310. Portions of the pin 340 project beyond the sides of second end portion 314. These projecting pin portions are received within tracks, such as track 344, that are affixed within cutouts provided in the sidewalls of the tray 320. The tracks, such as track 344, include a bracket 346 that may be affixed, by a nut and bolt arrangement, to the outer surface of each endwall of the tray 320. The bracket 346 includes folded-over ear portions 348, 349 that define end stop positions for the track. Upper and lower hardened tracks 350, 352, respectively, are affixed to the bracket 346 in a spaced-apart relationship to receive the pin 340. The depth of each track, such as track 344, is such that each pin, such as pin 340, is constrained from translational displacement in a direction along the pivoting axis of the pin 340. Thus, second pivot 332 allows rotational displacement of the second end 314 about the second pivot 332, as well as longitudinal translational displacement of second end 314. However, second end portion 314 is constrained from both translational displacement in a direction along the pivoting axis of pin 340, as well as in the vertical direction.

The first pivot 330 is comprised of a ball and socket assembly. More specifically, a bolt 360 mounts by threading engagement to the floor plate of the tray 320. A bearing, or ball 362 has a provided bore that rides on the shaft of bolt 360. The ball 362 is fixed in the vertical direction by an increased-diameter, stepped section shoulder 364 at the upper end of bolt 360, and a bushing 366 that slides over the lower portion of bolt 360 and has an outer diameter that is larger than that of the bore provided through ball 362.

The first end portion 312 of load cell 310 is machined to include a hollowed socket, which socket is conformed to receive the ball 362.

The first pivot 330, employing the ball and socket assembly, allows rotational displacement of the first end portion 312 of load cell 310 with respect to the tray 320, while preventing translational displacements with respect to the tray.

The load cell 310 is configured to be symmetrical about an axial plane, the edge of which is shown at 370, which is normal to the transmitted load F. The pivoting centers of the first and second pivots 330, 332 are positioned to be within the axial plane 370. Thus, axial plane 370 defines a neutral axis for the load cell 310 over most of its length.

In operation, a load transmitted from a load-bearing surface (not shown) is applied to the upper planar surface 310a of the load cell 310. This load is shown as a downwardly pointed arrow F. In response to the applied load, the load cell 310 rotationally displaces about its first and second pivots 330, 332, as indicated by arrows 380, 382, respectively. This displacement is sensed by strain gauge transducers or, optionally, shear web sensors (not shown) placed on the upper and lower surfaces of first and second end portions 312, 314, respectively.

As the load cell 310 deflects in response to the applied load, the distance between the first and second pivots 330, 332 is allowed to change via the sliding second pivot 332. Sliding second pivot 332 also relieves a strain produced between the load cell 310 and tray 320 produced by differing coefficients of thermal expansion.

In addition, as with the previously described improved load cell assemblies, the load cell assembly 300 of FIGS. 6A and 6B is not subject to inaccuracies caused by applied loads to the load cell 310 which would create a tilt of the load cell 310 with respect to the tray 320. That is, inasmuch as the first and second pivots are positioned in the neutral axis 370 of load cell 310, tilting forces to the load cell 310 do not result in a neutral axis shift, with a corresponding stress realignment within load cell 310 and an error induced in the readings of the strain gauge transducers (not shown). Further, a transmitted load that tends to tilt load cell 310 with respect to tray 320 cannot lift either the first, or the second end portions 312, 314, respectively, off of their pivots, inasmuch as the pivots 330, 332 constrain the first and second end portions 312, 314 from translational displacement in a direction parallel to a transmitted load. Thus, the aforedescribed cosine $\theta$-type errors, or errors due to a change in a pivot point with respect to the strain gauge transducers are eliminated.

A yet further feature of the improved load cell assembly 300 shown in FIGS. 6A, 6B is the ability of the load cell 310 to shed twisting moments that would otherwise be imparted thrugh tray 320. Tests have shown that twisting moments on tray 20 which are transmitted to the load cell can produce a significant error signal output from the strain gauge transducers. In the improved load cell assembly 300, however, a twisting moment on the tray 320 is shed by the first pivot 330 by rotation of the socket of second end portion 312 with respect to the ball 362.

A further feature of the improved load cell assembly 300 of FIGS. 6A, 6B is that the first pivot 330 constrains the load cell assembly from overall longitudinal translational displacement. As such, there is no need for provision of an elastic bumper, such as elastic bumper 60 of the prior art load cell assembly shown in FIG. 2, thereby eliminating errors produced by the use thereof.

FIGS. 7A, 7B depict an alternative embodiment of the improved load cell assembly. More specifically, FIG. 7A is a side elevational view of a load cell assembly, illustrating a load cell and a support tray, with the load cell being suspended from the support tray at a first end via a fixed pivot, and at a second end by means of a pivoting ball and socket assembly; FIG. 7B is an end, elevational view of the pivoting ball and socket assembly as shown in FIG. 7A.

Referring to FIGS. 7A, 7B, an alternative improved load cell assembly 400 includes a load cell 410 and a load cell support, or tray, 420. Load cell 410 is formed of a suitable metal alloy, or other material appropriate for the loads involved, and is machined with a central rectangular portion, as viewed from above and from the side, and first and second end portions 412, 414. The first and second end portions 412, 414 have a reduced vertical dimension compared to the central portion of load cell 410. Affixed to the upper and lower surfaces of first and second end portions 412, 414 are strain gauge transducers (not shown).

The tray 420 is a five-sided box, opening upwardly to receive the load cell 410.

Load cell 410 is suspended from the tray 420 via first and second pivots 430, 432, respectively. The first pivot 430 is identical in construction to the first pivot 230 of the embodiment shown in FIGS. 5A through 5C. That is, a pin 440 is press-fit, or otherwise secured, within a bore provided in the first end portion 412 of load cell 410. The pin projects from opposite sides of the first end portion 412 and is received within brackets, such as bracket 444, which are mounted to the outer surfaces of the sidewalls of tray 420. The brackets, such as bracket 444, have a provided hole having a diameter to accommodate the pin 440. In this manner, the first pivot 430 allows rotational displacement of the first end portion 412 about first pivot 430, with translational displacements of first portion 412 with respect to tray 420 being constrained.

The second pivot 432 is comprised of a pivoting ball and socket arrangement. More specifically, the shaft of a bolt 450 extends at right angles from a pivot pin 452. Pivot pin 452 has first and second ends 452a, 452b that are received within seats in the sidewalls of tray 420. The seats may be bores through the sidewalls, the bores being of a diameter to receive the pivot pin 452. Motion of pivot pin 452 is prevented along its pivot axis by a pair of stops 453, 454 suitably affixed to the outside sidewalls of tray 420. A bearing, or ball 460 has a provided bore that receives the shaft 452. Ball 460 is fixed in the vertical plane by a stepped diameter collar 462 on shaft 450, and by use of a bushing 464 that is secured to the top surface of ball 460 by a nut 466.

A socket is machined within the second end portion 414 of load cell 410 and has a contour suitable for receiving the ball 460 such that second end portion 414 may rotate about ball 460.

The load cell 410 is shaped symmetrically about an axial plane 470 that is normal to transmitted loads. First pivot 430 is positioned such that the pivoting axis of pivot pin 440 is within axial plane 470. The second pivot 432 is positioned such that the center of rotation of second end 414 about ball 460 is within the axial plane 470.

In operation, a load is transmitted from a load-bearing surface (not shown) to the upper planar suface 410a of the central portion of load cell 410. This load is indicated by a downwardly pointing arrow F. Load cell 410 responds by rotationally displacing about its first and second pivots 430, 432, as indicated by arrows 490, 492. This displacement is sensed by the strain gauge transducers (not shown) which respond by producing a signal which, when conventionally processed, indicates the load on load cell 410.

The improved load cell assembly 400 shown in FIGS. 7A, 7B is not subject to inaccuracies produced by transmitted loads tending to tilt the load cell 410 within the tray 420, as is the prior art design. First, inasmuch as the first and second pivots 430, 432 are positioned on the neutral axis 470 of load cell 410, forces tending to tilt the load cell 410 within the tray 410 do not skew the neutral axis, thereby changing stress loads at the strain gauge transducer sites.

Further, inasmuch as the first and second pivots 430, 432 constrain the first and second end portions 412, 414 of the load cell 410 such that they are not free to move off of the pivot sites, there is no cosine $\theta$-type error encountered. In addition, by constraining the first and second end portions 412, 414 to remain on the pivot sites of the first and second pivots 430, 432, respectively, the beam lengths from each strain gauge transducer to the pivot points remain constant, despite tilting-type transmitted loads.

Also, due to the pivot of second pivot 432 about its pivot pin 452, the distance between the first and second pivots 430, 432 may vary to accommodate displacement of the load cell 410. Further, twisting moments on tray 420 are shed by rotation of the second end portion 414 of load cell 410 about its ball and socket second pivot 432.

Finally, inasmuch as first pivot 430 prevents longitudinal translational displacement of the load cell 410, load cell 410 does not require the elastic bumper, such as elastic rubber bumper 60 of the prior art assembly shown in FIG. 2, thereby avoiding possible inaccuracies that may be produced as a result of the use of such bumpers.

FIGS. 8A, 8B depict an alternative embodiment of the improved load cell assembly. More specifically, FIG. 8A is a side elevational view illustrating a load cell that is suspended from a tray by means of a pair of shackles, the first shackle being attached to the tray by means of a gimballed support. FIG. 8B is an end elevational view of the first end of the load cell assembly of FIG. 8A, illustrating additional details of the gimballed support.

Referring to FIGS. 8A, 8B a load cell assembly 500 comprises a load cell 510 and a load cell tray 520. The load cell 510 is formed of a suitable metal alloy, or other material appropriate for the loads to be encountered, and is machined with a central, rectangular portion, as viewed from above and the side, and first and second end portions 512, 514, respectively. The first and second end portions 512, and 514 have a reduced vertical dimension from the central portion of load cell 510.

The tray 520 is a five-sided box, having an upwardly facing opening for receiving the load cell 510. A plurality of strain gauge transducers (not shown) are placed on the upper and lower surfaces of first and second end portions 512, 514, respectively, to produce signals representative of strain on load cell 510.

The load cell 510 is suspended from the tray 520 by means of a first shackle assembly 530 provided at the first end portion 512 of load cell 510 and a second shackle assembly 532 provided at the second end portion 514 of load cell 510.

The first shackle assembly 530 includes first and second shackle elements 540, 542. First and second shackle elements 540, 542 are mounted to a support 546 that extends inward of the tray 520 from the left-hand endwall thereof. A pin 548 is press-fit within a bore provided through support 546 and is retained by bushings (not shown) within holes provided in the first ends of first and second shackle elements 540, 542. The lower, second ends of shackle elements 540, 542 are mounted to the first end portion 512 of load cell 510 by means of a pin 550 that is press-fit through a bore provided in second end portion 512, with the ends of the pin being received in provided holes in the second ends of first and second shackle elements 540, 542, thereby forming a first pivot 534. Bushings, not shown, retain the second ends of the shackle elements 540, 542 on the pin.

In an identical manner, the second shackle assembly 532 includes a first shackle element 560 and a second shackle element (not shown) that mount to a support 562 projecting inwardly from the right-hand endwall of tray 520 by means of a pin 564. Similarly, the lower, second ends of the shackle elements, such as shackle element 560, are attached to a pin that is press-fit within the second end portion 514 of load cell 510, thereby forming a second pivot 536.

The principal difference between the first and second shackle assemblies 530, 532 is the difference between the support 546 and support 562. Support 562 is permanently affixed, as by welding, to the right-hand endwall of tray 520. Support 546, however, is free to pivot about a pin 570 that is press-fit in a provided bore in the left-hand endwall of tray 520. Support 546 is, therefore, a gimballed support for the first shackle assembly 530.

The load cell 510 is configured to be symmetrical about an axial plane, the edge of which is shown at 590, which axial plane is normal to transmitted loads. In addition, the first and second pivots 534, 536, respectively, are positioned such that the pivoting axes thereof are within axial plane 590. Axial plane 590 defines, therefore, a neutral axis through load cell 510.

In operation, a load is transmitted from a load-bearing surface (not shown) to the upper planar surface 510a of the central portion of load cell 510. This force is indicated by a downwardly pointing arrow F. The transmitted load produces a rotational displacement of the intermediate portion of load cell 510 about its first and second pivots 534, 536. These rotational displacements are indicated by arrows 592, 594. The strain gauge transducers respond to the displacement of load cell 510 to produce corresponding output electrical signals that may be conventionally processed to provide a display of the load on load cell 510.

The improved load cell assembly 500 as shown in FIGS. 8A and 8B is not subject to the errors caused by a transmitted load that tends to tilt the load cell 510 within the tray 520, as is the prior art load cell assembly shown in FIG. 2. Inasmuch as the first and second pivots 534, 536 are positioned on the netural axis of the load cell 510, and this neutral axis does not change for applied compressive or tensive transmitted loads, the stress contours through the strain gauge transducers do not vary due to neutral axis skewing. In addition, inasmuch as the first and second shackle assemblies 530, 532, respectively, constrain the first and second end portions 512, 514, respectively, from lifting off of their corresponding first and second pivots 534, 536, respectively, the pivot points, and therefore the beam lengths with respect to the strain gauge transducers remain constant. In addition, cosine $\theta$-type errors are eliminated due to the fact that the dominant load on the load cell 510 tends to maintain the axial axes 590 of load cell 510 in the horizontal plane.

In addition, the load cell assembly 500 of FIGS. 8A, 8B allows the distance between the first and second pivots 534, 536, respectively, to vary with displacement of the load cell 510 in response to applied loads, thereby eliminating errors, or accelerated wear due to binding at the pivots. In addition, strains produced by differing coefficients of thermal expansion between the tray 520 and load cell 510 may be relieved by varying the distance between the first and second pivots 534, 536, respectively.

Further, a twisting moment on the tray 520 is shed by rotation of the gimballed support 546, thereby isolating the load cell 510 from errors induced by tray twisting moments.

In fact, the shackle suspension of FIGS. 8A, 8B renders operation of the load cell 510 largely independent of dimensional stabilities of the tray 520.

Further, inasmuch as the operation of the first and second shackle assemblies 530, 532 tend to constrain load cell 510 from translational displacement in the longitudinal direction, there is no need for elastic bumpers, such as bumper 60 of FIG. 2, known to the prior art assembly. This, therefore, eliminates possible errors produced by such bumpers.

A final embodiment of the improved load cell assembly is illustrated in FIG. 9. FIG. 9 is a side elevational view of a load cell assembly 600 comprised of a load cell 610 and a load cell tray, or support, 620. The load cell 610 is of a configuration known to the prior art as shown in FIG. 2. Thus, load cell 610 is formed from a steel alloy, or other material suitable for the loads to be encountered, and is machined with a substantially rectangular central portion, as viewed from above and the side, with first and second tapered end portions 612, 614, respectively. Strain gauge transducers (not shown) are mounted to the lower surface of load cell 610.

The tray 620 includes a floor plate 622, left and right endwalls 624, 626, respectively, and first and second sidewalls (not shown).

The load cell 610 is supported on the floor plate 622 of tray 620 by first and second bearing rods 650, 652 that ride in semicircular, transverse grooves provided on the lower surface of first and second end portions 612, 614. The first and second bearing rods 650, 652 ride on first and second flat bearing plates 654, 656, respectively, having provided curved lower surfaces (shown in end view) to help relieve twists on tray 620.

A load is transmitted from a load-bearing surface (not shown) to the upper surface 610a of load cell 610. This load is indicated by a downwardly pointing arrow F. As has been described hereinabove, the load cell assembly 600 of FIG. 9 is subject to inaccuracies in response to loads being transmitted to load cell 610 tending to lift an end, such as first end portion 612 of load cell 610 off of its bearing rod 600 to the point that it forcibly engages its corresponding overly extending retaining plate. The point at which the end portion engages the retaining plate now becomes the pivot point for that end of the load cell, thereby changing the beam lengths from each strain gauge transducer to the pivot point and resulting in an error in the strain gauge produced signal.

The embodiment of the load cell assembly 600 shown in FIG. 9 eliminates this source of error, by providing first and second retaining plates 660, 662. Retaining plates 660, 662 are affixed to the endwalls 624, 626, correspondingly, such that the retaining plates 660, 662 extend over the end portions 612, 614, respectively, of the load cell 610. Projecting downwardly from each of the retaining plates 660, 662 are defined up-stops 670, 672, respectively. The up-stops 670, 672 define the point at which a raised end of the beam will engage the corresponding retaining plates 660, 662, respectively. The positions of the up-stops 670, 672 are selected, either analytically or empirically, to define a pivot point to the load cell 610 that will result in a minimum stain gauge transducer (not shown) error.

Thus, assuming that the loads transmitted to the load cell 610 tend to raise the first end portion 612, the up-stop 670 is selected such that when the first end portion 612 engages up-stop 670, the resultant signal produced by the strain gauge transducers (not shown) is virtually the same as that signal that would be produced if the same load, as applied to load cell 610 did not tend to create the tilting moment. In this way, a significant source of error due to tilt of the load cell 610 may be minimized, or eliminated.

In summary, various embodiments of improved load cell assemblies have been disclosed. These embodiments minimize, or eliminate inaccuracies produced by loads tending to tilt the load cell within the load cell tray. In addition, various embodiments of the invention include means to allow the distance between the pivot points at opposite ends of the load cell to vary in response to displacement of the load cell. Further, means have been described that allow the load cell to shed twisting moments that would otherwise be applied to it from the load cell tray. Also disclosed are means for minimizing the effects of changes in load cell tray dimensions.

While preferred embodiments of the invention have been described in detail, it should be apparent that many modifications and variations thereto are possible, all of which fall within the true spirit and scope of the invention.

For example, whereas the preferred embodiments of the invention shown in FIGS. 3A through 3C, 5A through 5C, 7A, 7B, and 8A, 8B illustrate the use of a load cell that is configured to be symmetrical about a neutral axis, it should be understood that the present invention may be practiced by use of an asymmetrical cell such as the cell known to the prior art shown in FIG. 2, employing the suspension means described with respect to these FIGURES.

Further, whereas the preferred embodiments of the invention described herein are intended for use in vehicle platform scales, it should be understood that any other application of the improved load cell assembly described herein is equally within the scope of the invention.

In addition, the present invention may be practiced in shear beam type load cells.

The embodiments of the invention in which an exclusive property or privilege is claimed are defined as follows:

1. A scale comprising:
   a load-bearing surface;
   a load cell assembly including a deflectable load cell having a load receiving surface, a support for said load cell and suspension means for suspending said load cell from said load cell support;
   means for mounting the load-bearing surface on said load receiving surface of said load cell such that a load on said load-bearing surface is transmitted to said load receiving surface and applies a predetermined strain to said load cell;
   strain transducer means mounted to said load cell for producing an output signal corresponding to said strain condition of the load cell;
   said load cell suspension means including:
   first and second pivot means located at spaced-apart portions of said load cell for producing rotational deflective motion of the intermediate portion of said load cell about said first and second pivot means responsive to said transmitted load-bearing surface load,
   said first pivot means comprising a first pair of pins projecting from opposite sides of a first end of said load cell,
   said second pivot means comprising a second pair of pins projecting from opposite sides of a second end of said load cell, the axial axes of said first and second pair of pins being positioned in a plane normal to a transmitted load-bearing surface load, said load cell support having seats for receiving each of said first and second pair of pins, said seats being predeterminedly configured such that said pins may rotate within said seats, while being constrained from translational displacement in a direction parallel to said transmitted load-bearing surface load, said load cell assembly, said load-bearing surface and said load-bearing surface mounting means cooperating whereby the strain applied to said load cell resulting from a load is substantially independent of the position of said load on said load-bearing surface.

2. The scale of claim 1, wherein said load cell is shaped symmetrically about an axial plane normal to a transmitted load-bearing surface load and wherein the axial axes of said first and second pair of pins are within said axial plane.

3. The scale of either one of claims 1 or 2, wherein said load cell support seats are predeterminedly configured to constrain said first and second pair of pins from translational displacement in a plane normal to said transmitted load-bearing surface load.

4. A scale comprising:
a load-bearing surface;
a load cell assembly including a deflectable load cell having a load receiving surface, a support for said load cell, and suspension means for suspending said load cell from said load cell support;
means for mounting said load-bearing surface on said load receiving surface of said load cell such that a load on said load-bearing surface is transmitted to said load receiving surface and applies a predetermined strain to said load cell;
strain transducer means mounted to said load cell for producing an output signal corresponding to said strain condition of the load cell;
said load cell suspension means including:
first and second pivot means located at spaced-apart portions of said load cell for producing rotational deflective motion of the intermediate portion of said load cell about said first and second pivot means responsive to said transmitted load-bearing surface load, the pivoting axis of each of said first and second pivot means being positioned within an axial plane of said load cell, which axial plane is substantially neutral to both tensive and compressive transmitted load-bearing surface loads,
said load cell assembly, said load-bearing surface and said load-bearing surface mounting means cooperating such that the strain applied to said load cell resulting from a load is substantially independent of the position of said load on said load-bearing surface.

5. The scale of claim 4, wherein said load cell is shaped symmetrically about an axial plane normal to a transmitted load-bearing surface load and wherein said suspension means first and second pivots are positioned such that the pivoting axes thereof are within said axial plane.

6. The scale of either one of claims 4 or 5, wherein said strain transducer means comprises a plurality of bending moment strain gauges positioned at predetermined locations intermediate said first and second pivot means, at least one bending moment strain gauge being mounted to the load cell surface that is under compression in response to a transmitted load-bearing surface load, and at least one bending moment strain gauge being mounted to the load cell surface that is under tension in response to a transmitted platform load.

7. The scale of either one of claims 4 or 5, wherein said strain transducer means comprises at least one shear web strain gauge, said shear web strain gauge being mounted intermediate said first and second pivot means and predeterminedly aligned with respect to said substantially neutral axial plane such that said shear web strain gauge produces an output signal related to deflections of said load cell in response to a transmitted load from said load-bearing surface.

8. The scale of either one of claims 4 or 5, wherein:
said first and second pivot means include means for constraining said load cell from translational displacement in a plane normal to said transmitted load-bearing surface load.

9. The scale of claim 8, wherein said first and second pivot means comprise pins projecting from said load cell at said spaced-apart portions, the axial axes of said pins being positioned within said substantially neutral axial plane, said pins being received within seats provided in said load cell support, said seats being conformed to the surface of said pins such that said pins may rotate within, while being constrained from translational displacement with respect to said seats.

10. A scale comprising:
a load-bearing surface;
a load cell assembly including a deflectable load cell, a support for said load cell and suspension means for suspending said load cell from said load cell support;
means for mounting the load-bearing surface to the load cell assembly such that a load on said load-bearing surface is transmitted to said load cell resulting in a predetermined strain condition thereof;
strain transducer means mounted to said load cell for producing an output signal corresponding to said strain condition of the load cell;
said load cell suspension means including:
first and second pivot means located at spaced-apart portions of said load cell for producing rotational deflective motion of the intermediate portion of said load cell about said first and second pivot means responsive to said transmitted load-bearing surface load,
said first pivot means including means for constraining a first end of said load cell from translational displacement in a plane normal to said transmitted load-bearing surface load while permitting rotational displacement of said first end with respect to said load cell support;
said second pivot means including means for constraining a second end of said load cell from translational displacement in a direction parallel to the pivoting axis of said second pivot means and permitting translational displacement of said second end in a direction orthogonal to the pivoting axis of said second pivot means and within a plane normal to said transmitted load-bearing surface load,
whereby a twisting moment on said load cell support is shed by rotational displacement of said first pivot means and translational displacement of said second pivot means allows the distance between said first and second pivot means to vary with deflection of said load cell.

11. The scale of claim 10, wherein:

said first pivot means comprises a ball and socket assembly wherein a ball is mounted in a fixed position to said load cell support, said ball being received within a socket provided in said first end of said load cell such that said first end is free to rotate about said ball while being constrained from translational displacement in a plane normal to said transmitted load-bearing surface load; and said second pivot means comprises a pair of pins projecting from opposite sides of said second end of said load cell, the axial axes of said pins being aligned with a plane normal to said transmitted load-bearing surface load, said load cell support having track means for receiving and guiding said pins, said track means constraining said pins from translational displacement in a direction orthogonal to said axial axes of said pins and within a plane normal to said transmitted load-bearing surface load.

12. A scale comprising:

a load-bearing surface;

a load cell assembly including a deflectable load cell, a support for said load cell and suspension means for suspending said load cell from said load cell support;

means for mounting said load-bearing surface to the load cell assembly such that a load on said load-bearing suface is transmitted to said load cell producing a predetermined strain condition thereof;

strain transducer means mounted to said load cell for producing an output signal corresponding to said strain condition of said load cell;

said load cell suspension means including:

first and second pivot means located at spaced-apart portions of said load cell for producing rotational deflective motion of the intermediate portion of said load cell about said first and second pivot means responsive to said transmitted load-bearing surface load, said first pivot means including means for constraining a first end of said load cell from translational displacement in a plane normal to said transmitted load-bearing surface load; and said second pivot means including means for constraining a second end of said load cell from translational displacement in a direction parallel to the axial axes of said second pivot means while permitting both translational displacement of said second end in a direction orthogonal to said axial axes and within a plane normal to said transmitted load-bearing surface load and rotational displacement of said second end with respect to said load cell support, whereby a twisting moment or said load cell support is shed by rotational displacement of said second pivot means, said second pivot means further allowing the distance between said first and second pivot means to vary with deflection of said load cell.

13. The scale of claim 12, wherein:

said first pivot means comprises a pair of pins projecting from opposite sides of said load cell first end, said pins being received within seats provided in said load cell support, said seats being conformed to the surfaces of said pins such that the pins may rotate within, while being constrained from translational displacement with respect to said seats; and said second pivot means comprises a pivotable ball and socket assembly wherein a ball is mounted to the load cell support on a pivot, which pivot permits displacement of the ball in a direction orthogonal to the axial axes of said second pivot means, said ball being received within a socket provided in said second end of said load cell such that said second end is free to rotate about said ball.

14. A scale comprising:

a load-bearing surface;

a load cell assembly including a deflectable load cell, a support for said load cell and suspension means for suspending said load cell from said load cell support;

means for mounting said load-bearing surface to the load cell assembly such that a load on said load-bearing surface is transmitted to said load cell producing a predetermined strain condition thereof;

strain transducer means mounted to said load cell for producing an output signal corresponding to said strain condition of said load cell;

said load cell suspension means including:

first and second pivot means located at spaced-apart portions of said load cell for producing rotational deflective motion of the intermediate portion of said load cell about said first and second pivot means responsive to said transmitted load-bearing surface load, said load cell suspension means comprising first and second shackles, each shackle being pivotally mounted at a first end thereof to said load cell support, said first shackle being pivotally mounted at a second end thereof to a first end of said load cell to form said first pivot means, said second shackle being pivotally mounted at a second end thereof to a second end of said load cell to form said second pivot means, the pivots of said shackles constraining said load cell from translational displacement in a direction parallel to the axial axes of said first and second pivot means while permitting the distance between said first and second pivot means to vary with deflection of said load cell.

15. The scale of claim 14, wherein said first shackle is secured to said load cell support by a gimballed support, said gimballed support being freely rotatable with respect to said load cell support on an axis orthogonal to the axial axes of the first and second pivot means, whereby a twisting moment on said load cell support is shed by rotation of said gimballed support.

16. A scale comprising:

a load-bearing surface;

a load cell assembly including a deflectable load cell, a support for said load cell and suspension means for suspending said load cell from said load cell support;

means for mounting the load-bearing surface to the load cell assembly such that a load on said load-bearing surface is transmitted to said load cell resulting in a predetermined strain condition thereof;

strain transducer means mounted to said load cell for producing an output signal corresponding to said strain condition of the load cell;

said load cell suspension means including:

first and second pivot means located at spaced-apart portions of said load cell for producing rotational deflective motion of the intermediate portion of said load cell about said first and second pivot means responsive to said transmitted load-bearing surface load, said first pivot means comprising a first pair of pins projecting from opposite sides of a first end of said load cell, said second pivot means comprising a second pair of pins projecting from opposite sides of a second end of said load cell, the axial axes of said first and second pair of pins being positioned in a plane normal to a transmitted load-bearing surface load, said load cell support having seats for receiving each of said first and second pair of pins, said seats being predeterminedly configured such that said pins may rotate within said seats, while being constrained from translational displacement in a direction parallel to said transmitted load-bearing surface load, said load cell support seats be predeterminedly configured such that said first pair of pins is constrained from translational displacement in a plane normal to said transmitted load-bearing surface load, said second pair of pins being permitted translational displacement in a direction orthogonal to the axial axes of said pins and in a plane normal to said transmitted load-bearing surface load, whereby translational displacement of said second pair of pins allows the distance between the first and second pivot means to vary with deflection of said load.

17. A scale comprising:
a load-bearing surface;
a load cell assembly including a deflectable load cell, a support for said load cell and suspension means for suspending said load cell from said load cell support;
means for mounting the load-bearing surface to the load cell assembly such that a load on said load-bearing surface is transmitted to said load cell resulting in a predetermined strain condition thereof;
strain transducer means mounted to said load cell for producing an output signal corresponding to said strain condition of the load cell;
said load cell suspension means including:
first and second pivot means located at spaced-apart portions of said load cell for producing rotational deflective motion of the intermediate portion of said load cell about said first and second pivot means responsive to said transmitted load-bearing surface load,
said first pivot means comprising a first pair of pins projecting from opposite sides of a first end of said load cell,
said second pivot means comprising a second pair of pins projecting from opposite sides of a second end of said load cell,
the axial axes of said first and second pair of pins being positioned in a plane normal to a transmitted load-bearing surface load,
said load cell support having seats for receiving each of said first and second pair of pins, said seats being predeterminedly configured such that said pins may rotate within said seats, while being constrained from translational displacement in a direction parallel to said transmitted load-bearing surface load,
said load cell support seats be predeterminedly configured such that said first pair of pins is constrained from translational displacement in a plane normal to said transmitted load-bearing surface load, said second pair of pins being permitted translational displacement in a direction orthogonal to the axial axes of said pins and in a plane normal to said transmitted load-bearing surface load, whereby translational displacement of said second pair of pins allows the distance between the first and second pivot means to vary with deflection of said load,
said load cell being shaped symmetrically about an axial plane normal to a transmitted load-bearing surface load and wherein the axial axes of said first and second pair of pins are within said axial plane.

18. The scale of claims 16 or 17 wherein said load cell support seats for receiving said second pair of pins comprise parallel tracks, said tracks constraining said second pair of pins from translational displacement in a direction parallel to the axial axes of said second pair of pins, while permitting translational displacement of said second pair of pins in a direction orthogonal to said axial axes and within a plane normal to said transmitted load-bearing surface load.

19. A scale comprising:
a load-bearing surface;
a load cell assembly including a deflectable load cell, a support for said load cell, and suspension means for suspending said load cell from said load cell support;
means for mounting said load-bearing surface to the load cell assembly such that a load on said load-bearing surface is transmitted to said load cell resulting in a predetermined strain condition thereof;
strain transducer means mounted to said load cell for producing an output signal corresponding to said strain condition of the load cell;
said load cell suspension means including:
first and second pivot means located at spaced-apart portions of said load cell for producing rotational deflective motion of the intermediate portion of said load cell about said first and second pivot means responsive to said transmitted load-bearing surface load, the pivoting axis of each of said first and second pivot means being positioned within an axial plane of said load cell, which axial plane is substantially neutral to both tensive and compressive transmitted load-bearing surface loads,
said first pivot means including means for constraining a first end of said load cell from translational displacement in a plane normal to said transmitted load-bearing surface load;
said second pivot means including means for constraining a second end of said load cell from translational displacement in a direction parallel to said pivoting axis of said second pivot means and permitting translational displacement of said second end in a direction orthogonal to said pivoting axis and within said neutral axial plane,
whereby translational displacement of said second pivot means allows the distance between said first and second pivot means to vary with deflection of said load cell.

20. A scale comprising:
a load-bearing surface;
a load cell assembly including a deflectable load cell, a support for said load cell, and suspension means for suspending said load cell from said load cell support;

means for mounting said load-bearing surface to the load cell assembly such that a load on said load-bearing surface is transmitted to said load cell resulting in a predetermined strain condition thereof;

strain transducer means mounted to said load cell for producing an output signal corresponding to said strain condition of the load cell;

said load cell suspension means including:

first and second pivot means located at spaced-apart portions of said load cell for producing rotational deflective motion of the intermediate portion of said load cell about said first and second pivot means responsive to said transmitted load-bearing surface load, the pivoting axis of each of said first and second pivot means being positioned within an axial plane of said load cell, which axial plane is substantially neutral to both tensive and compressive transmitted load-bearing surface loads, said first pivot means including means for constraining a first end of said load cell from translational displacement in a plane normal to said transmitted load-bearing surface load;

said second pivot means including means for constraining a second end of said load cell from translational displacement in a direction parallel to said pivoting axis of said second pivot means and permitting translational displacement of said second end in a direction orthogonal to said pivoting axis and within said neutral axial plane, whereby translational displacement of said second pivot means allows the distance between said first and second pivot means to vary with deflection of said load cell, said load cell being shaped symmetrically about an axial plane normal to a transmitted load-bearing surface load and wherein said suspension means first and second pivots are positioned such that the pivoting axis thereof are within said axial plane.

21. The scale of claims 19 or 20 wherein:

said first pivot means comprises a pair of first pins projecting from opposite sides of said first end of said load cell, the axial axes of said first pins being aligned within said substantially neutral axial plane, said first pins being received within seats provided in said load cell support, said seats being conformed to the surfaces of said first pins such that said pins may rotate within, while being constrained from translational displacement with respect to said seats; and said second pivot means comprises a pair of second pins projecting from opposite sides of said second end of said load cell, the axial axes of the second pins being aligned with said neutral axial plane, said load cell support having track means for receiving and guiding said second pins, said track means constraining said second pins from translational displacement in a direction parallel to said pivoting axis of said second pivot means while permitting translational displacement of said second pins in a direction orthogonal to said pivoting axis and within said substantially neutral axial plane, and further permitting rotational displacement of said second pins within said track means.

22. A scale comprising:

a load-bearing surface;

a load cell assembly including a deflectable load cell, a support for said load cell, and suspension means for suspending said load cell from said load cell support;

means for mounting said load-bearing surface to the load cell assembly such that a load on said load-bearing surface is transmitted to said load cell resulting in a predetermined strain condition thereof;

strain transducer means mounted to said load cell for producing an output signal corresponding to said strain condition of the load cell;

said load cell suspension means including:

first and second pivot means located at spaced-apart portions of said load cell for producing rotational deflective motion of the intermediate portion of said load cell about said first and second pivot means responsive to said transmitted load-bearing surface load, the pivoting axis of each of said first and second pivot means being positioned within an axial plane of said load cell, which axial plane is substantially neutral to both tensive and compressive transmitted load-bearing surface loads, said first pivot means including means for constraining a first end of said load cell from translational displacement in a plane normal to said transmitted load-bearing surface load while permitting rotational displacement of said first end with respect to said load cell support, said second pivot means including means for constraining a second end of said load cell from translational displacement in a direction parallel to said pivoting axis of said second pivot means and permitting translational displacement of said second end in a direction orthogonal to said pivoting axis and within said substantially neutral axial plane, whereby a twisting moment on said load cell support is shed by rotational displacement of said first pivot means and translational displacement of said second pivot means allows the distance between said first and second pivot means to vary with deflection of said load cell.

23. A scale comprising:

a load-bearing surface;

a load cell assembly including a deflectable load cell, a support for said load cell, and suspension means for suspending said load cell from said load cell support;

means for mounting said load-bearing surface to the load cell assembly such that a load on said load-bearing surface is transmitted to said load cell resulting in a predetermined strain condition thereof;

strain transducer means mounted to said load cell for producing an output signal corresponding to said strain condition of the load cell;

said load cell suspension means including:

first and second pivot means located at spaced-apart portions of said load cell for producing rotational deflective motion of the intermediate portion of said load cell about said first and second pivot means responsive to said transmitted load-bearing surface load, the pivoting axis of each of said first and second pivot means being positioned within an axial plane of said load cell, which axial plane is substantially neutral to both tensive and compressive transmitted load-bearing surface loads, said first pivot means including means for constraining a first end of said load cell from translational displacement in a plane normal to said transmitted load-bearing surface load while permitting rotational displacement of said first end with respect to said load cell support, said second pivot means including means for constraining a second end of said load cell from translational displacement in a direction parallel to said pivoting axis of said second pivot means and permitting translational displacement of said second end in a direction orthogonal to said pivoting axis and within said substantially neutral axial plane, whereby a twisting moment on said load cell support is shed by rotational displacement of said first pivot means and translational displacement of said second pivot means allows the distance between said first and second pivot means to vary with deflection of said load cell, said load cell being shaped symmetrically about an axial plane normal to a transmitted load-bearing surface load and wherein said suspension means first and second pivots are positioned such that the pivoting axes thereof are within said axial plane.

24. The scale of claims 22 or 23 wherein:

said first pivot means comprises a ball and socket assembly wherein a ball is mounted in a fixed position to said load cell support, said ball being received in a socket provided in said first end of said load cell such that said first end is free to rotate about said ball while being constrained from translational displacement in a plane normal to said transmitted load-bearing surface load; and said second pivot means comprises a pair of pins projecting from opposite sides of said second end of said load cell, the axial axes of said pins being aligned with said substantially neutral axial plane, said load cell support having track means for receiving and guiding said pins, said track means constraining said pins from translational displacement in a direction parallel to said pivoting axis of said second pivot means while permitting translational displacement of said pins in a direction orthogonal to said pivoting axis and within said substantially neutral axial plane and further permitting rotation of said pins within said track means.

25. A scale comprising:

a load-bearing surface;

a load cell assembly including a deflectable load cell, a support for said load cell, and suspension means for suspending said load cell from said load cell support;

means for mounting said load-bearing surface to the load cell assembly such that a load on said load-bearing surface is transmitted to said load cell resulting in a predetermined strain condition thereof;

strain transducer means mounted to said load cell for producing an output signal corresponding to said strain condition of the load cell;

said load cell suspension means including:

first and second pivot means located at spaced-apart portions of said load cell for producing rotational deflective motion of the intermediate portion of said load cell about said first and second pivot means responsive to said transmitted load-bearing surface load, the pivoting axis of each of said first and second pivot means being positioned within an axial plane of said load cell, which axial plane is substantially neutral to both tensive and compressive transmitted load-bearing surface loads, said first pivot means including means for constraining a first end of said load cell from translational displacement in a plane normal to said transmitted load-bearing surface load, said second pivot means including means for constraining a second end of said load cell from translational displacement in a direction parallel to the axial axis of said second pivot means while permitting both translational displacement of said second end in a direction orthogonal to said axial axis and within said substantially neutral axial plane and rotational displacement of said second end of said load cell with respect to said load cell support, whereby a twisting moment on said load cell support is shed by rotational displacement of said second pivot means, said second pivot means further allowing the distance between said first and second pivot means to vary with deflection of said load cell.

26. A scale comprising:

a load-bearing surface;

a load cell assembly including a deflectable load cell, a support for said load cell, and suspension means for suspending said load cell from said load cell support;

means for mounting said load-bearing surface to the load cell assembly such that a load on said load-bearing surface is transmitted to said load cell resulting in a predetermined strain condition thereof;

strain transducer means mounted to said load cell for producing an output signal corresponding to said strain condition of the load cell;

said load cell suspension means including:

first and second pivot means located at spaced-apart portions of said load cell for producing rotational deflective motion of the intermediate portion of said load cell about said first and second pivot means responsive to said transmitted load-bearing surface load, the pivoting axis of each of said first and second pivot means being positioned within an axial plane of said load cell, which axial plane is substantially neutral to both tensive and compressive transmitted load-bearing surface loads, said first pivot means including means for constraining a first end of said load cell from translational displacement in a plane normal to said transmitted load-bearing surface load, said second pivot means including means for constraining a second end of said load cell from translational displacement in a direction parallel to the axial axis of said second pivot means while permitting both translational displacement of said second end in a direction orthogonal to said axial axis and within said substantially neutral axial plane and rotational displacement of said second end of said load cell with respect to said load cell support, whereby a twisting moment on said load cell support is shed by rotational displacement of said second pivot means, said second pivot means further allowing the distance between said first and second pivot means to vary with deflection of said load cell, said load cell being shaped symmetrically about an axial plane normal to a transmitted load-bearing surface load and wherein said suspension means first and second pivots are positioned such that the pivoting axis thereof are within said axial plane.

27. The scale of claims 25 or 26 wherein:

said first pivot means comprises a pair of pins projecting from opposite sides of said load cell first end, the axial axes of said pins being aligned witthin said substantially neutral axial plane, said pins being received within seats provided in said load cell support, said seats being conformed to the surfaces of said pins such that said pins may rotate within, while being constrained from translational displacement with respect to said seats; and said second pivot means comprises a pivotable ball and socket asembly wherein a ball is mounted to the load cell support on a pivot, which pivot permits displacement of the ball in a direction orthogonal to the axial axis of said second pivot means, said ball being received within a socket provided in said second end of said load cell such that said second end is free to rotate about said ball.

28. A scale comprising:

a load-bearing surface;

a load cell assembly including a deflectable load cell, a support for said load cell, and suspension means for suspending said load cell from said load cell support;

means for mounting said load-bearing surface to the load cell assembly such that a load on said load-bearing surface is transmitted to said load cell resulting in a predetermined strain condition thereof;

strain transducer means mounted to said load cell for producing an output signal corresponding to said strain condition of the load cell;

said load cell suspension means including:

first and second pivot means located at spaced-apart portions of said load cell for producing rotational deflective motion of the intermediate portion of said load cell about said first and second pivot means responsive to said transmitted load-bearing surface load, the pivoting axis of each of said first and second pivot means being positioned within an axial plane of said load cell, which axial plane is substantially neutral to both tensive and compressive transmitted load-bearing surface loads, said load cell suspension means comprising first and second shackle means, each shackle means being pivotally mounted at a first end thereof to said load cell support, said first shackle means being pivotally mounted at a second end thereof to a first end of said load cell to form said first pivot means, said second shackle means being pivotally mounted at a second end thereof to a second end of said load cell to form said second pivot means, the pivots of said shackle means constraining said load cell from translational displacement in a direction parallel to the axial axes of said first and second pivot means, while permitting the distance between said first and second pivot means to vary with deflection of said load cell.

29. A scale comprising:

a load-bearing surface;

a load cell assembly including a deflectable load cell, a support for said load cell, and suspension means for suspending said load cell from said load cell support;

means for mounting said load-bearing surface to the load cell assembly such that a load on said load-bearing surface is transmitted to said load cell resulting in a predetermined strain condition thereof;

strain transducer means mounted to said load cell for producing an output signal corresponding to said strain condition of the load cell;

said load cell suspension means including:

first and second pivot means located at spaced-apart portions of said load cell for producing rotational deflective motion of the intermediate portion of said load cell about said first and second pivot means responsive to said transmitted load-bearing surface load, the pivoting axis of each of said first and second pivot means being positioned within an axial plane of said load cell, which axial plane is substantially neutral to both tensive and compressive transmitted load-bearing surface loads, said load cell suspension means comprising first and second shackle means, each shackle means being pivotally mounted at a first end thereof to said load cell support, said first shackle means being pivotally mounted at a second end thereof to a first end of said load cell to form said first pivot means, said second shackle means being pivotally mounted at a second end thereof to a second end of said load cell to form said second pivot means, the pivots of said shackle means constraining said load cell from translational displacement in a direction parallel to the axial axes of said first and second pivot means, while permitting the distance between said first and second pivot means to vary with deflection of said load cell said load cell being shaped symmetrically about an axial plane normal to a transmitted load-bearing surface load and wherein said suspension means first and second pivots are positioned such that the pivoting axes thereof are within said axial plane.

30. The scale of claims 24 or 29 wherein said first shackle means is secured to said load cell support by a gimballed support, said gimballed support being freely rotatable with respect to said load cell support on an axis orthogonal to the axial axes of the first and second pivot means, whereby a twisting moment on said load cell support is shed by rotation of said gimballed support.

* * * * *

UNITED STATES PATENT AND TRADEMARK OFFICE
CERTIFICATE OF CORRECTION

PATENT NO. : 4,560,017

DATED : December 24, 1985

INVENTOR(S) : Robert B. Hood

It is certified that error appears in the above-identified patent and that said Letters Patent is hereby corrected as shown below:

Delete the paragraph starting at Column 4, line 50, and ending at Column 5, line 3, "In yet a further...of its corresponding support."

Column 6, line 40, delete "a" after "have".
Column 10, line 34, "surface" should be --surfaces--.
Column 11, line 7, "280" (first occurrence) should be --276--.
Column 13, line 33, "thrugh" should be --through--.
Column 14, line 45, "suface" should be --surface--.
Column 14, line 60, "410" (second occurrence) should be --420--.
Column 17, line 59, "stain" should be --strain--.
Column 21, line 29 (Claim 12, line 9), "suface" should be --surface--.
Column 21, line 55 (Claim 12, line 35), "or" should be --on--.
Column 23, line 19 (Claim 16, line 37), "be" should be --being--.
Column 23, line 67 (Claim 17, line 37), "be" should be --being--.
Column 24, line 15, (Claim 18, line 1), insert --,-- after "17".
Column 25, line 38 (Claim 20, line 44), "axis" should be --axes--.
Column 28, line 65, (Claim 26, line 48), "axis" should be --axes--.
Column 29, line 9 (Claim 27, line 12), "asembly" should be --assembly--.
Column 30, line 41 (Claim 29, line 39), insert --,-- after "cell".

UNITED STATES PATENT AND TRADEMARK OFFICE
CERTIFICATE OF CORRECTION

PATENT NO. : 4,560,017  
DATED : December 24, 1985  
INVENTOR(S) : Robert B. Hood Page 2 of 2

It is certified that error appears in the above-identified patent and that said Letters Patent is hereby corrected as shown below:

Column 30, line 47 (Claim 30, line 1), "24" should be --28--.
Column 30, line 47, (Claim 30, line 1), insert --,-- after "29".

Signed and Sealed this

Sixth Day of May 1986

[SEAL]

Attest:

DONALD J. QUIGG

Attesting Officer

Commissioner of Patents and Trademarks